US012577046B2

(12) United States Patent
Flynn et al.

(10) Patent No.: US 12,577,046 B2
(45) Date of Patent: Mar. 17, 2026

(54) LOAD HANDLING DEVICE

(71) Applicant: Ocado Innovation Limited, Hatfield (GB)

(72) Inventors: Damian Flynn, Hatfield (GB); Marek Havel, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 295 days.

(21) Appl. No.: 18/245,778

(22) PCT Filed: Sep. 17, 2021

(86) PCT No.: PCT/EP2021/075703
§ 371 (c)(1),
(2) Date: Mar. 17, 2023

(87) PCT Pub. No.: WO2022/058550
PCT Pub. Date: Mar. 24, 2022

(65) Prior Publication Data
US 2024/0025638 A1      Jan. 25, 2024

(30) Foreign Application Priority Data

Sep. 18, 2020     (GB) ...................................... 2014789

(51) Int. Cl.
  *B65G 1/04*        (2006.01)
  *B65G 1/06*        (2006.01)
(52) U.S. Cl.
  CPC ......... *B65G 1/0464* (2013.01); *B65G 1/0478* (2013.01); *B65G 1/065* (2013.01); *B65G 2201/0235* (2013.01)
(58) Field of Classification Search
  None
  See application file for complete search history.

(56) References Cited

U.S. PATENT DOCUMENTS 9,598,141 B1      3/2017  Doerksen et al.
10,351,344 B2 *   7/2019  Gebhardt ............. B65G 1/0492
(Continued)

FOREIGN PATENT DOCUMENTS

CN        103612882  A      3/2014
CN        103895995  B      4/2016
(Continued)

OTHER PUBLICATIONS

Office Action (Examination Report No. 1) issued on Apr. 5, 2024, by the Australian Patent Office in corresponding Australian Patent Application No. 2021346222. (4 pages).
(Continued)

*Primary Examiner* — Mark C Hageman
(74) *Attorney, Agent, or Firm* — Gregory Matt McCloskey

(57) ABSTRACT

A load handling device is disclosed for lifting and moving containers stacked in a storage system having a grid structure. The load handling device includes a container receiving space; a lifting mechanism arranged to lift a container; a vehicle body; a wheel assembly arranged to support the vehicle body, the wheel assembly having a first set of wheels and a second set of wheels; and a drive mechanism for selectively driving rotation of the first set of wheels and the second set of wheels. Each wheel includes a wheel positioning mechanism configured to rotate the wheel about a respective second axis of rotation to selectively lower or raise the first set of wheels or the second set of wheels to selectively engage or disengage the first set of wheels with a first set of grid members or the second set of wheels with a second set of grid members.

33 Claims, 25 Drawing Sheets

(56) References Cited

U.S. PATENT DOCUMENTS

| | | | | |
|---|---|---|---|---|
| 11,851,275 B2 * | 12/2023 | Lindbo | ................. | B65G 57/03 |
| 11,858,738 B2 * | 1/2024 | Lindbo | ............... | B65G 1/0464 |
| 2016/0229630 A1 | 8/2016 | Gebhardt et al. | | |
| 2019/0263251 A1 | 8/2019 | Rallings | | |
| 2019/0322452 A1 | 10/2019 | Austrheim et al. | | |
| 2023/0144676 A1 * | 5/2023 | Heggebø | ............. | B65G 1/0457 |
| | | | | 414/279 |

FOREIGN PATENT DOCUMENTS

| | | | |
|---|---|---|---|
| CN | 208666169 U | 3/2019 | |
| CN | 110356489 A | 10/2019 | |
| CN | 209618088 U | 11/2019 | |
| CN | 109855664 B | 2/2021 | |
| EP | 3053855 A2 | 8/2016 | |
| EP | 3053855 A3 | 8/2016 | |
| GB | 2584766 A | 12/2020 | |
| JP | S473462 U | 9/1972 | |
| JP | S49133307 U | 11/1974 | |
| JP | S5018251 Y | 6/1975 | |
| JP | S6093562 U | 6/1985 | |
| JP | H03200616 A | 9/1991 | |
| JP | 2013258819 A | 12/2013 | |
| JP | 2016118231 A | 6/2016 | |
| JP | 2016529181 A | 9/2016 | |
| JP | 2020505288 A | 2/2020 | |
| WO | 2015019055 A1 | 2/2015 | |
| WO | 2015140216 A1 | 9/2015 | |
| WO | 2015185628 A2 | 12/2015 | |
| WO | 2017148939 A1 | 9/2017 | |
| WO | 2017153583 A1 | 9/2017 | |
| WO | 2018020199 A1 | 2/2018 | |
| WO | 2018064709 A1 | 4/2018 | |
| WO | 2018137898 A1 | 8/2018 | |
| WO | 2019238703 A1 | 12/2019 | |

OTHER PUBLICATIONS

First Office Action issued on May 28, 2024, by the Japanese Patent Office in corresponding Japanese Patent Application No. 2023-517951, and an English Translation of the Office Action. (13 pages).

International Search Report (PCT/ISA/210) and Written Opinion (PCT/ISA/237) mailed on Jan. 10, 2022, by the European Patent Office as the International Searching Authority for International Application No. PCT/EP2021/075703.

Search Report under Section 17 issued in corresponding Application No. GB2014789.8 dated Mar. 8, 2021.

Office Action issued on Aug. 5, 2024, by the Canadian Patent Office in corresponding Canadian Patent Application No. 3, 198,585. (4 pages).

Combined Search & Examination Report issued on Mar. 15, 2022 by the UK Intellectual Property Office in corresponding GB Application No. 2113307.9 (9 pages) corresponding to Applicant's U.S. Appl. No. 18/245,778.

Office Action issued on Apr. 7, 2025 by the Korean Patent Office in corresponding KR Application No. 10-2023-7013157 (11 pages) corresponding to Applicant's U.S. Appl. No. 18/245,778.

Office Action issued on Jul. 3, 2025 by the Canadian Patent Office in corresponding CA Application No. 3, 198,585 (5 pages) corresponding to Applicant's U.S. Appl. No. 18/245,778.

Examination Report issued on Oct. 20, 2025 by the European Patent Office in corresponding EP Application No. 21778441.2 (7 pages) corresponding to Applicant's U.S. Appl. No. 18/245,778.

* cited by examiner

(a)
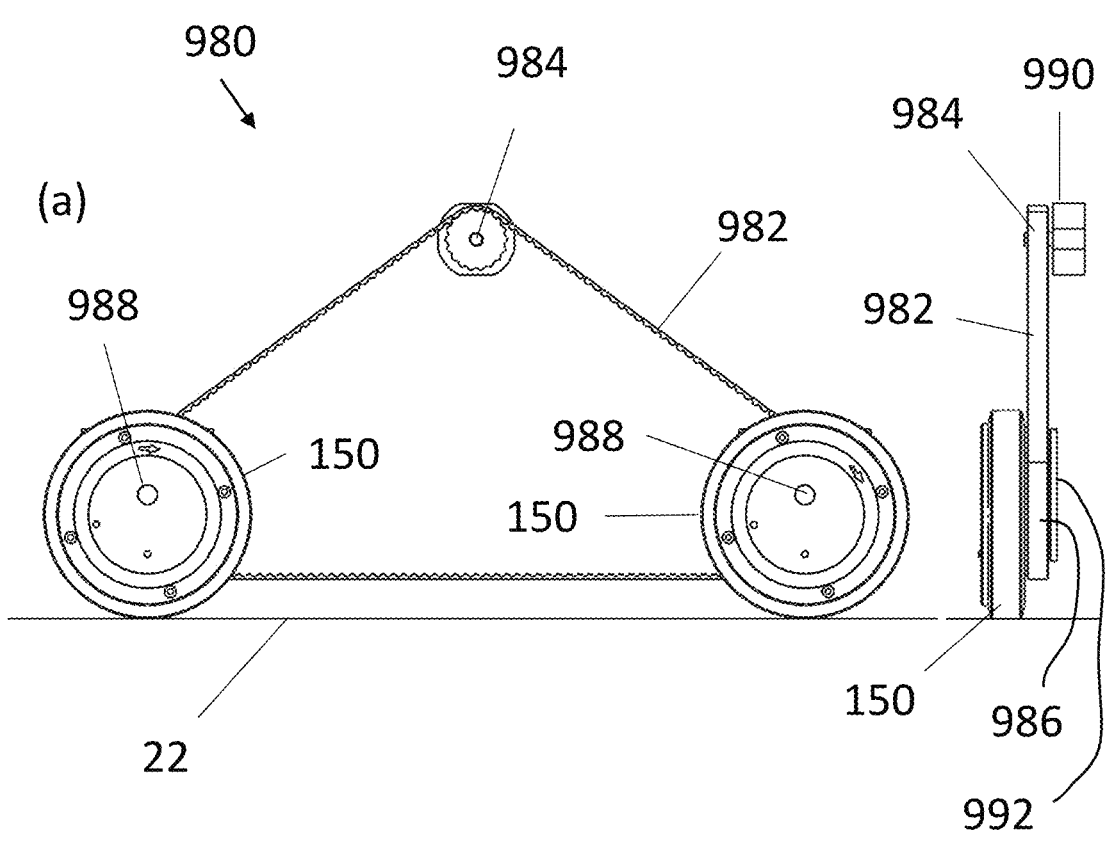
(b)
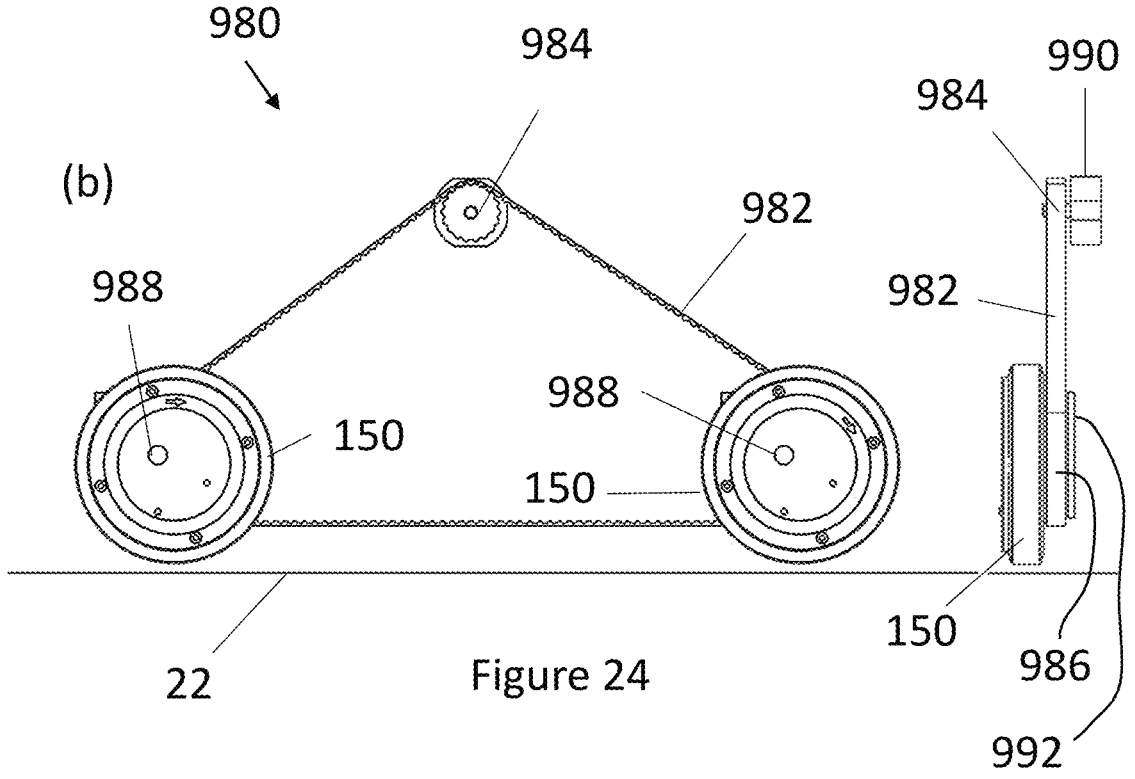
Figure 24

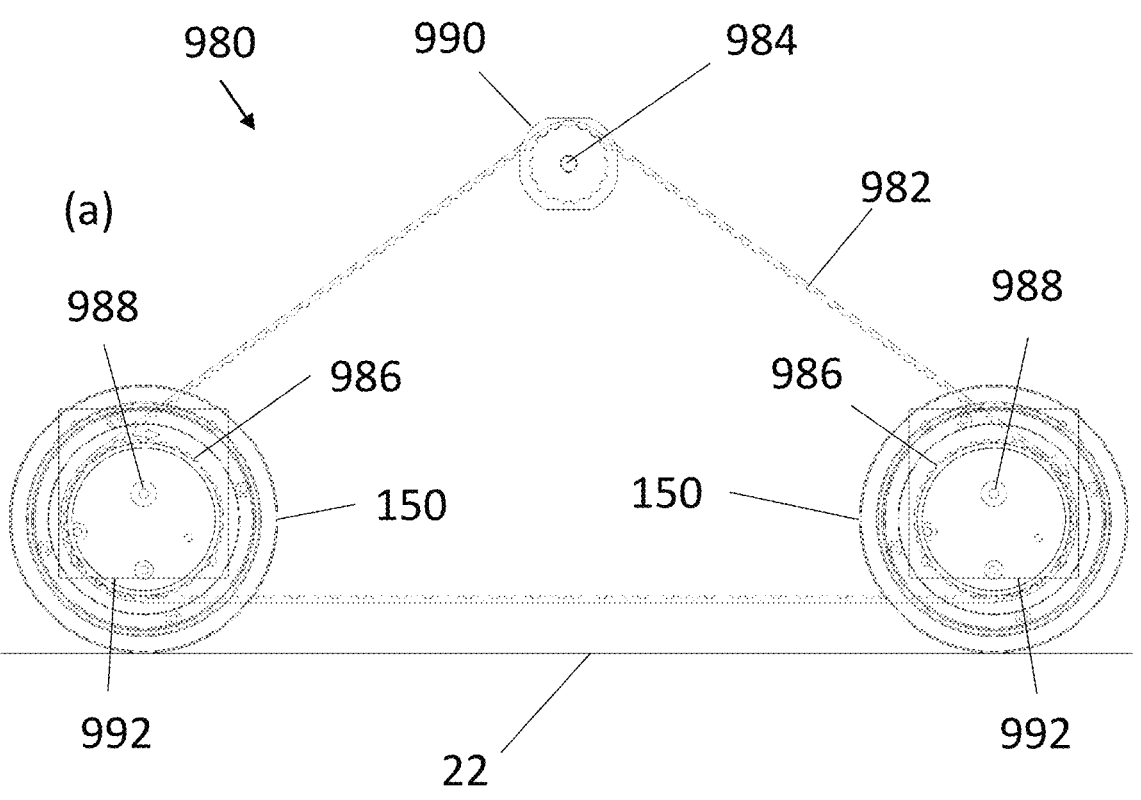
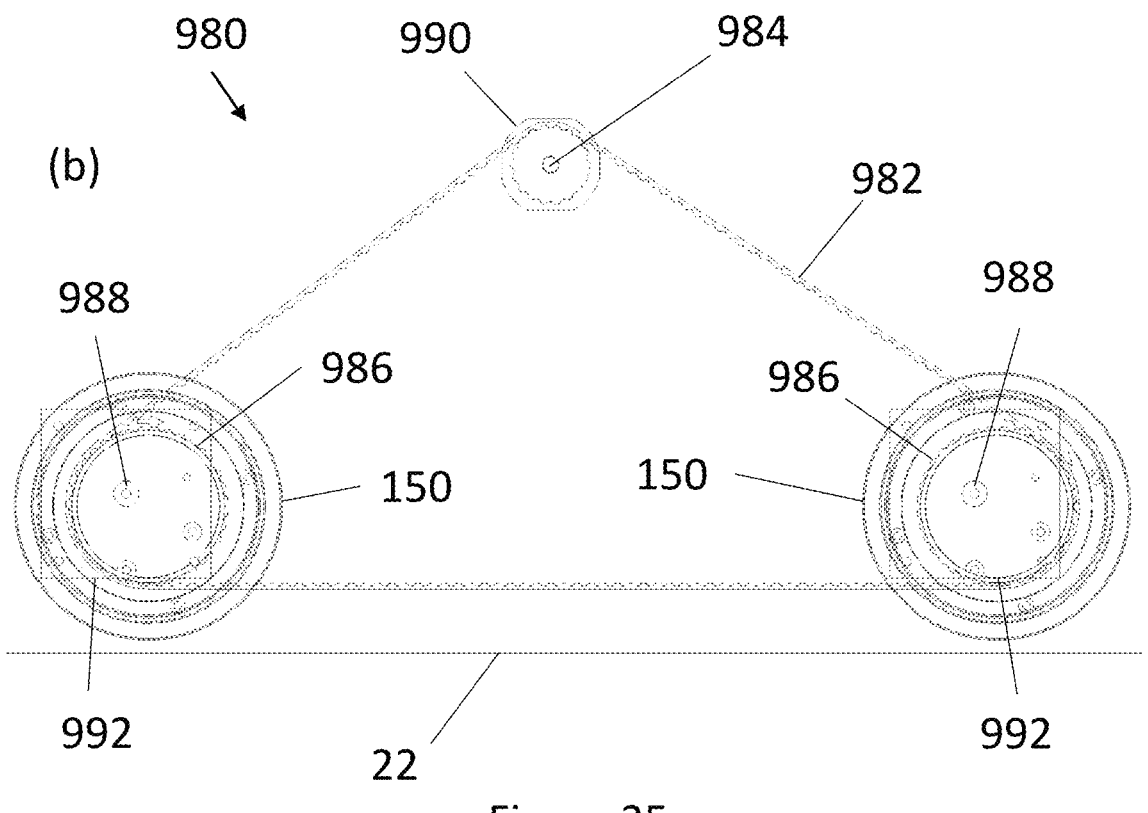
Figure 25

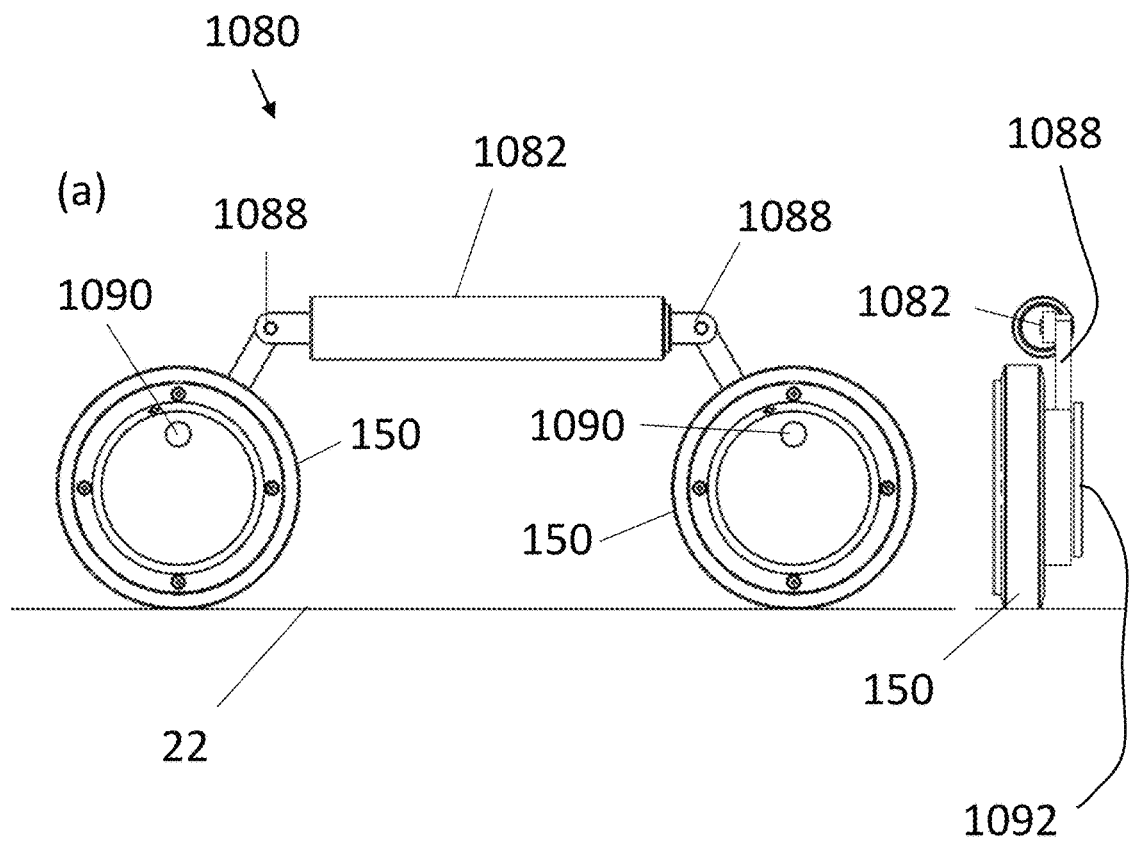
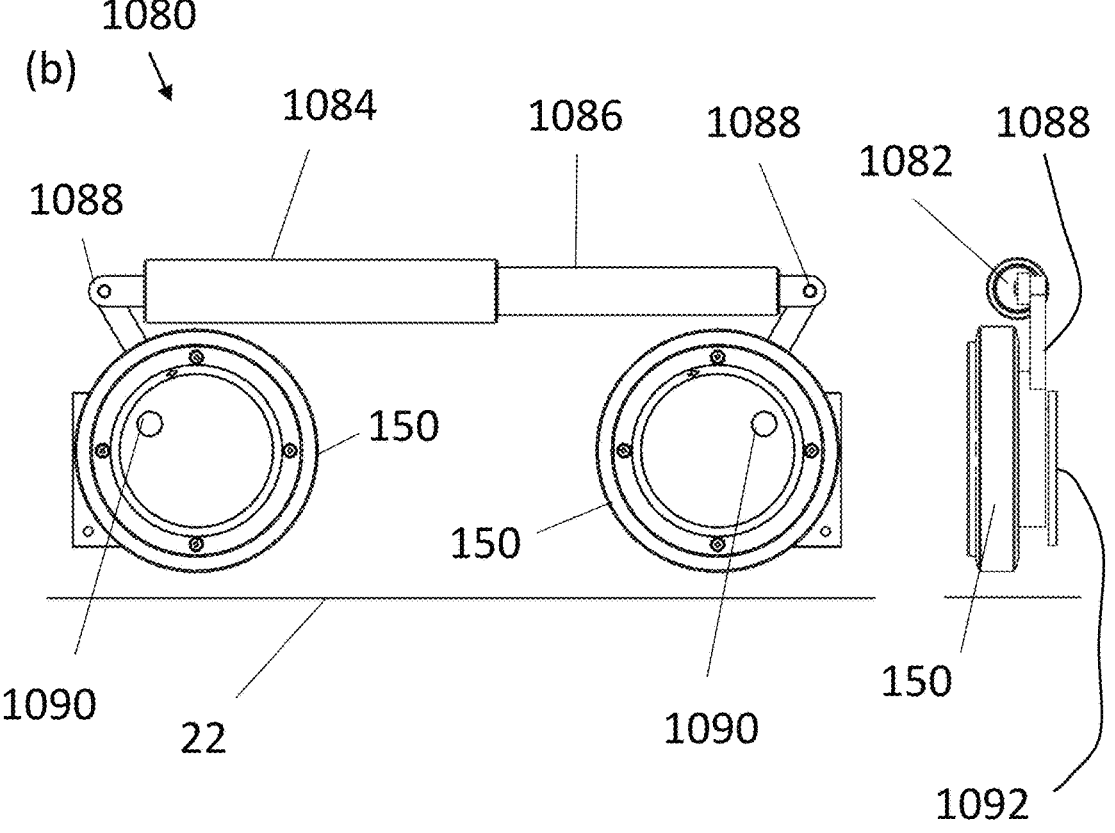
Figure 26

(a)
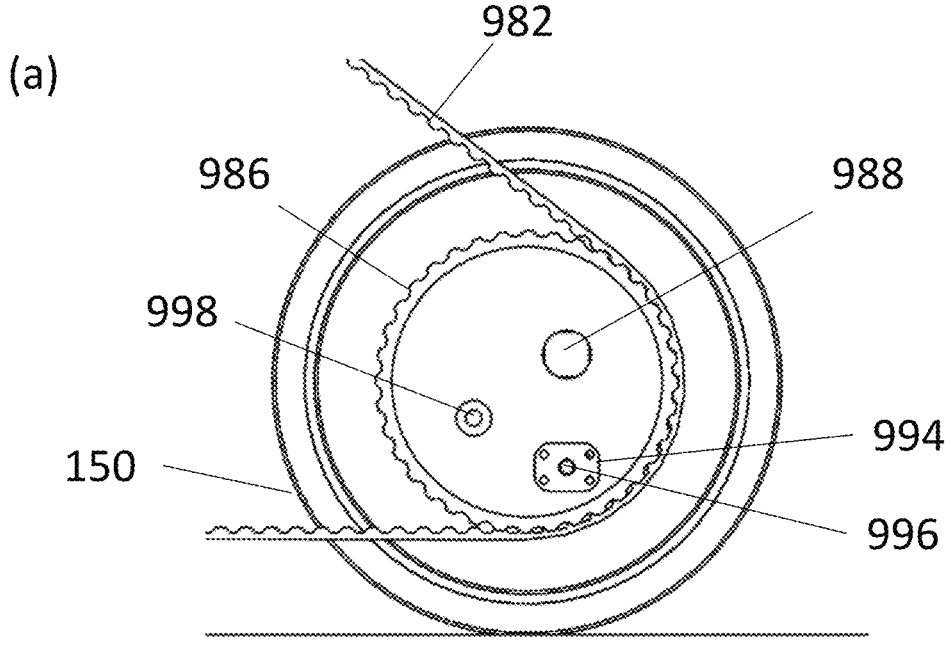
(b)
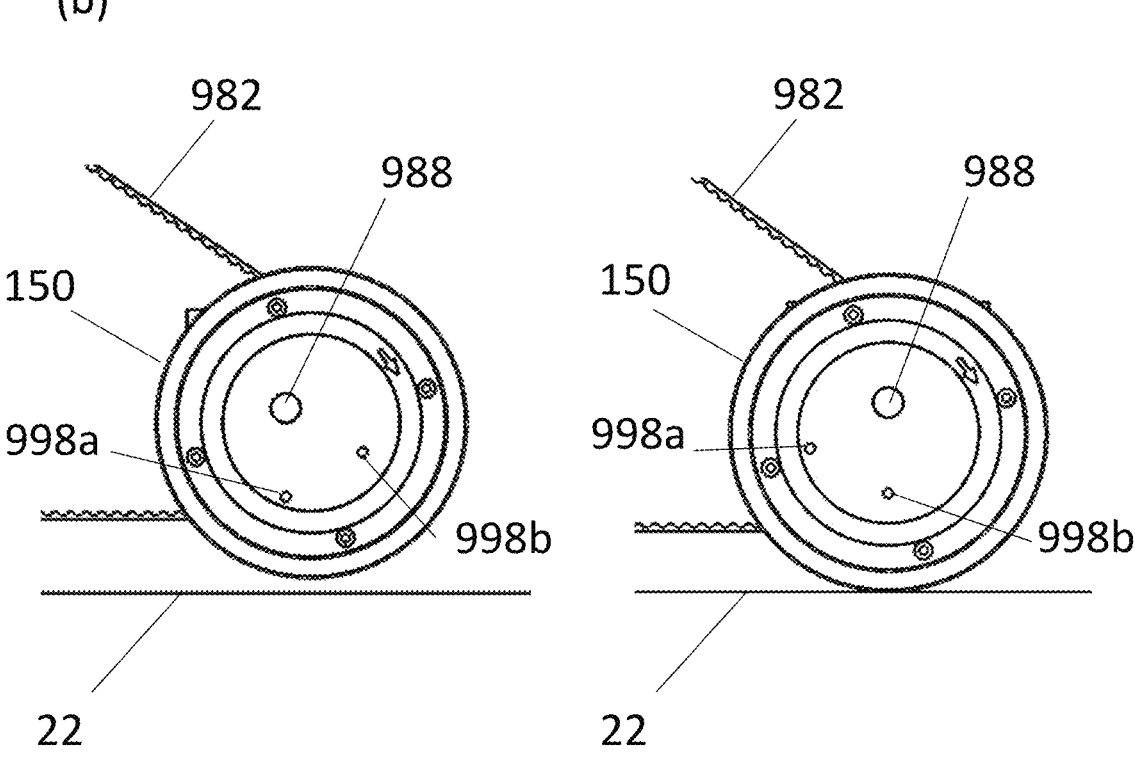
Figure 28

LOAD HANDLING DEVICE

TECHNICAL FIELD

The present invention relates to the field of load handling devices for handling storage containers or bins in a store comprising a grid of stackable containers, more specifically to an apparatus and method for changing direction of a load handling device on the grid.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A system of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. The grid framework structure is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal members 18 is arranged perpendicularly to a second set of parallel horizontal members 20 in a grid pattern to form a plurality of horizontal grid structures 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 comprises a grid or grid structure 15 which includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle body 32 for engaging with the first set of rails or tracks to guide movement of the device in a first direction, and a second set of wheels 36 consisting of a pair of wheels 36 on each side of the vehicle body 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction on the grid.

WO2017/153583 (Ocado Innovation Limited) teaches a load handling device comprising a wheel positioning mechanism for enabling lateral movement of the device in one of two transverse directions by enabling either a first or second set of wheels to selectively engage the first or second set of rails or tracks (22a or 22b). The wheel positioning mechanism comprises a complicated arrangement of linkages driven by a linear actuator or motor to selectively lower or raise the first set of wheels or the second set of wheels into engagement or disengagement with the first set of tracks or rails or the second set of tracks or rails.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

An alternative wheel positioning mechanism is thus required to selectively drive the load handling device to move in two lateral X and Y directions on the grid structure.

This application claims priority from UK application number GB2014789.8 filed on 18 Sep. 2020, the contents being herein incorporated by reference.

SUMMARY OF THE INVENTION

The present applicant has realised that by eccentrically mounting a wheel such that the wheel rotates about an axis that is offset from its central rotational axis, the wheel can be raised or lowered by controlling the direction of rotation of the wheel about its eccentric axis. By applying this concept to the wheels of a load handling device, the direction of the load handling device on the grid structure can be changed by allowing a first set of wheels or a second set of wheels to rotate about an axis that is offset from the respective central axis of rotation of the wheels (i.e. eccentrically), to selectively raise or lower the first set of wheels or the second set of wheels relative to the vehicle body of the load handling device.

The present invention thus provides a load handling device for lifting and moving one or more containers stacked in a storage system, the storage system comprising a grid structure comprising a plurality of grid members arranged in a grid pattern for guiding the movement of the load handling device on the grid structure, the load handling device comprising:

a) container receiving space located above the grid structure; and b) a lifting mechanism arranged to lift a container from a stack into the container receiving space;

c) a vehicle body;

d) a wheel assembly arranged to support the vehicle body, the wheel assembly comprising a first set of wheels for engaging with a first set of grid members to guide movement of the load handling device in a first direction, and a second set of wheels for engaging with a second set of grid members to guide the movement of the load handling device in a second direction, wherein the second direction is transverse to the first direction, each wheel of the first set of wheels and the second set of wheels being rotatable about a respective first axis of rotation and a respective second axis of rotation, wherein the respective second axis of rotation is radially offset from the respective first axis of rotation;

e) a driving mechanism for selectively driving the rotation of the first set of wheels and the second set of wheels about their respective first axes of rotation;

wherein each wheel of the first and second set of wheels comprises a wheel positioning mechanism configured to rotate the wheel about its second axis of rotation to selectively lower or raise the first set of wheels or the second set of wheels relative to the vehicle body, and thereby to selectively engage or disengage the first set of wheels with the first set of grid members or the second set of wheels with the second set of grid members.

The wheel assembly of the load handling device comprises a first set of wheels and a second set of wheels. With reference to FIG. 5, optionally, the first set of wheels comprises a pair of wheels on the front of a vehicle body and a pair of wheels on the back of the vehicle body for engaging with the first set of grid members to guide movement of the device in a first direction. Similarly, the second set of wheels optionally comprises of a pair of wheels on each side of the vehicle for engaging with the second set of grid members to guide movement of the device in a second direction. However, it is not necessary that the first set of wheels comprises a pair of wheels on the front and back of the vehicle body to ensure the stability of the load handling device on the grid structure, since the first set of wheels can comprise at least one wheel on the front and back of the vehicle body. Preferably, the at least one wheel of the first set of wheels on the front and back of the vehicle body are positioned so that they are diagonally opposed to each other. Similarly, the second set of wheels can comprise at least one wheel on either side of the vehicle body. Preferably, the at least one wheel on either side of the vehicle body of the second set of wheels are diagonally opposed to each other.

Each wheel of the first and second set of wheels is arranged to rotate about two axes of rotation, namely a first axis of rotation and a second axis of rotation. Putting this in another way, all of the wheels of the first and second set of wheels are each arranged to rotate about two axes of rotation, namely a first axis of rotation and a second axis of rotation. Thus, each wheel of the first and second set of wheels is therefore arranged to rotate about the first axis of rotation to move the load handling device in the first direction or the second direction depending on whether the first set of wheels are engaged with the first set of grid members or the second set of wheels are engaged with the second set of grid members. Preferably, the load handling device comprises a drive mechanism for selectively driving the rotation of the first set of wheels and the second set of wheels about their respective first axes of rotation.

To change direction of the load handling device on the grid structure, each wheel of the first and second set of wheels comprises a wheel positioning mechanism configured to rotate the wheel about its second axis of rotation to selectively lower or raise the first set of wheels or the second set of wheels relative to the vehicle body, and thereby to selectively engage or disengage the first set of wheels with the first set of grid members or the second set of wheel with the second set of grid members. For the purpose of the present invention, the vehicle body can comprise the vehicle frame or vehicle chassis.

Preferably, the drive mechanism is arranged so that each wheel of the first set of wheels and/or the second set of wheels comprises:

a) a first drive mechanism for driving rotation of each respective wheel of the first set of wheels and/or the second set of wheels about its respective first axis of rotation, and wherein the wheel positioning mechanism comprises b) a second drive mechanism for driving rotation of the wheel about its second axis of rotation.

The wheel positioning mechanism can be envisaged to function as an actuator to effect lowering or raising of the wheel relative to the vehicle body by rotating the wheel about its second axis of rotation. For the purpose of the present invention, lowering of the wheel to engage with a grid member can be termed deployment of the wheel and raising of the wheel to disengage the wheel from the grid member can be term stowing of the wheel. Optionally, the first drive mechanism for driving rotation of each respective wheel of the first set of wheels and/or the second set of wheels about its respective first axis of rotation comprises a first drive mechanism for driving rotation of each respective wheel of the first set of wheels and/or the second set of wheels about its respective first axis of rotation. Thus, each wheel of the first and second sets of wheels comprises a first driving mechanism for driving rotation of each respective wheel of the first set of wheels and/or the second set of wheels about the first axis of rotation and a wheel positioning mechanism comprising a second drive mechanism for driving rotation of the wheel about its second axis of rotation. For example, the wheel preferably comprises a wheel hub. The first driving mechanism and the wheel positioning mechanism are preferably integrated into the wheel hub. Preferably, the wheel comprises an outer rotor rotatably mounted to the wheel hub.

As each wheel comprises a driving mechanism and a wheel positioning mechanism, in order to effect moving the load handling device in the first direction and/or the second direction, the wheels would need to be rotated about their respective first axes in synchronization or simultaneously so that all of the first set of wheels and/or the second set of wheels are lowered or raised at substantially the same time. Preferably, the load handling device further comprises a controller comprising one or more processors and memory storing instructions that, when executed by the one or more processors, cause the one or more processors to actuate the first drive mechanism to rotate each wheel of the first or second set of wheels about their respective first axes of rotation in synchronization. The controller is configured to actuate the respective first drive mechanism in synchronization so that each of the respective wheels is driven to rotate about its respective first axis of rotation in synchronization. Equally, the respective wheel positioning mechanism or actuator of each wheel is actuated in synchronization or simultaneously to rotate all of the first and/or second set of wheels about their respective second axes of rotation. Preferably, the one or more processors executes the memory storing instructions to actuate the second drive mechanism to rotate each respective wheel of either the first or second set of wheels about its respective second axis of rotation in synchronization. In other words, the controller is configured to actuate the respective second drive mechanism of each wheel of the first and/or second set of wheels in synchronization so that each of the respective wheels is driven to rotate about its respective second axis of rotation to cause either the first or the second set of wheels to be raised or lowered relative to the vehicle body in synchronization or at the same time.

Optionally, the first drive mechanism and/or the second drive mechanism of each of the wheels of the first set and/or second set of wheels can operate independently from each other but can be controlled from a common controller to actuate their respective first drive mechanism and/or the second drive mechanism in synchronisation. In order for the respective wheels of the first set of wheels and the second set of wheels to rotate about their respective first and second axes of rotation, it is preferable that the first driving mechanism comprises an outer rotor that is rotatable about an inner hub or wheel hub. This allows the inner hub or wheel hub to be anchored to the vehicle body so as to be rotatable about the second axis of rotation.

There are various examples of the first driving mechanism for driving the wheels about their respective first axis of rotation. In one example of the present invention, preferably the first drive mechanism comprises an outer rotor that is annular around the respective first axis of rotation and an inner hub, the outer rotor rotatably mounted to the outer circumference of the inner hub such that the outer rotor rotates around the inner hub about the respective first axis of rotation. The outer rotor comprises an outer surface for engagement with a grid member or track. In this example, an outer ring or rotor of the wheel is configured to rotate about an inner stator about the first axis of rotation. Preferably, the first driving mechanism comprises a hub motor where, the outer rotor comprises a plurality of permanent magnets that is arranged to rotate about inner coils of an inner stator integrated within the wheel hub.

In yet another example, the first drive mechanism comprises an outer rotor having an outer surface for engagement with a grid member/track and an inner surface having a plurality of radial teeth to form an annular gear, a driveshaft with a pinion gear mounted thereon, the pinion gear comprising a plurality of teeth that mesh with the annular gear to transmit torque to rotate the outer rotor about its respective first axis of rotation. In this example, the pinion gear mounted on a drive shaft comprises a plurality of teeth, and driven by a motor is used to drive rotation of the outer rotor about the first axis of rotation.

In yet another example, the first drive mechanism comprises an outer rotor comprising a driveshaft having a sprocket mounted thereon and a toothed belt coupled to the sprocket for transmitting torque to rotate the outer rotor about its respective first axis of rotation. Preferably, the wheel and the sprocket are concentric and the toothed belt driven by a motor causes the sprocket, and thus the wheel, to rotate about the first axis of rotation.

As well as various examples of rotating the wheel about the first axis of rotation, there are also various examples of driving rotation of the wheel about an eccentric axis or the second axis of rotation. In one example, the wheel positioning mechanism comprises a rack and pinion gear mechanism, the rack and pinion gear mechanism comprising a curved rack having a plurality of teeth and a pinion gear engageable with the plurality of teeth of the curved rack and rotatable around the curved rack about the second axis of rotation, the pinion gear being mounted to a portion of the wheel such that rotation of the pinion gear around the curved rack selectively raises or lowers the wheels of the respective first or second set of wheels relative to the vehicle body. In this example, the rack has a radius of curvature at an origin that corresponds with the second axis of rotation of the wheel. Putting it another way, the centre of curvature of the curved rack is at the second axis of rotation. The curved rack is mounted to the vehicle body such that the pinion gear is rotatable around the curved rack about the second axis of rotation of the wheel. As the second axis of rotation is radially offset from the centre point of the wheel and the pinion gear is mounted to a portion of the wheel, rotation of the pinion gear, and thus the wheel, about the second axis of rotation raises or lowers the wheels. The wheel comprises an outer rotor and a hub. The portion of the wheel can be the wheel hub such that rotation of the pinion gear mounted to the hub of the wheel raises or lowers the wheel. Optionally, the second drive mechanism is configured for driving rotation of the pinion gear around the curved rack about the second axis of rotation. The second drive mechanism can optionally comprise an electric motor integrated into the wheel hub. Rotation of the pinion gear around the curved rack can be by the second driving mechanism configured to drive rotation of the pinion gear relative to the curved rack, or alternatively, drive rotation of the curved rack relative to the pinion gear.

In yet another example of the wheel positioning mechanism, the second drive mechanism comprises a drive shaft eccentrically mounted to a portion of the wheel and configured to rotate the wheel about their respective second axes of rotation. In this example, a separate motor can be eccentrically mounted to the wheel having a drive shaft that is arranged to rotate the wheel about the second axis of rotation. The separate motor (second motor) is anchored to the vehicle body.

In yet another example, the wheel positioning mechanism comprises a planetary gear mechanism (epicyclical gear mechanism) comprising a planetary gear and a sun gear, wherein the planetary gear is mounted to a portion of the wheel (wheel hub) and is engaged with the sun gear so as to be driven around the sun gear about the second axis of rotation by the second drive mechanism. The sun gear is mounted to the vehicle body such that it is offset from the first axis of rotation of the wheel. Thus, the planetary gear mounted to the wheel hub and is driven to rotate about the sun gear causes the wheel to rotate about the second axis of rotation. The second axis of rotation is coaxial with the mounting of the sun gear to the vehicle body. Preferably, the second drive mechanism is configured for driving rotation of the sun gear about the second axis of rotation. To ensure that the planetary gear is properly engaged (meshed) with the sun gear, preferably, the wheel positioning mechanism further comprises an annular gear having an inner surface comprising a plurality of radial teeth, wherein the sun gear is coaxial with the annular gear and the planetary gear is engaged with the plurality of radial teeth of the annular gear so as to be driven around the inner surface of the annular gear by the sun gear about the second axis of rotation. As a result, the sun gear drives the planetary gear around the inside of the annular gear.

In another example, the wheel positioning mechanism comprises a belt or chain configured to drive rotation of one or more wheels of the first or second set of wheels about their respective second axes such that movement of the belt or chain selectively raises or lowers the one or more wheels relative to the vehicle body. The second drive mechanism may be configured to drive the belt or chain.

In another example, the second driving mechanism comprises a linear actuator configured to drive rotation of one or more wheels of the first or second set of wheels about their respective second axes such that movement of the linear actuator selectively raises or lowers the one or more wheels relative to the vehicle body. The linear actuator may be connected to the one or more wheels by one or more pivotal linkages such that the one or more pivotal linkages convert linear motion of the linear actuator to rotational motion of the one or more wheels about their respective second axes.

In all of the examples discussed above, the wheel is driven by a first and a second drive mechanism. The first and second drive mechanism can comprise a first and second motor, e.g. a first and second electric motor. The first motor is for the driving the wheel about the first axis of rotation and the second motor is for driving rotation of the wheel about the second axis of rotation.

In yet another example of the present invention, the wheel can be driven by a single drive mechanism, i.e. the drive mechanism for driving the wheel about the first axis of rotation can also be used to lift the wheel by rotating the wheel about the second axis of rotation. In one example, the wheel positioning mechanism comprises a planetary gear mechanism comprising a planetary gear rotatable about the first axis of rotation and a sun gear. The planetary gear is mounted to a portion of the wheel and is engaged with the sun gear such that rotation of the sun gear by the drive mechanism causes the planetary gear to rotate about the first axis of rotation so as to move the load handling device in either of the first direction or the second direction on the grid structure, and the sun gear has a rotational axis about the second axis of rotation. Preferably, the planetary gear is configured to rotate about the second axis of rotation.

Preferably, the wheel positioning mechanism comprises a locking mechanism configured to lock rotation of the planetary gear about the first axis of rotation so as to allow the planetary gear to be driven by the sun gear about the second axis of rotation. In one configuration, the planetary gear is passive so as to rotate about its axis of rotation being the first axis of rotation. As the planetary gear is mounted to a portion of the wheel (namely the wheel hub), rotation of the planetary gear about its own axis driven by the sun gear causes the wheel to rotate about the first axis of rotation. Selectively braking the rotation of the planetary gear about its axis of rotation causes the planetary gear to ride up/down and around the sun gear by the rotation of the sun gear. As the sun gear rotates about the second axis of rotation, the wheel mounted to the planetary gear is caused to raise or lower around the sun gear.

Preferably, the second axis of rotation is radially offset from the first axis of rotation in the range 10 mm to 20 mm, more preferably, 10 mm to 15 mm to provide sufficient clearance from the grid structure when lifting the wheel from the grid member or track.

Preferably, the vehicle body houses one or more operational components, wherein the wheel assembly is arranged such that the first set of wheels are mounted to a first pair of opposing sides of the vehicle body and the second set of wheels are mounted to a second pair of opposing sides of the vehicle body. The one or more operational components for operation of the load handling device on the grid structure can include but are not limited to a battery for providing power to the motors, PCB control boards etc. Preferably, the wheel positioning mechanism is integrated into the wheel. More preferably, the first driving mechanism for driving rotation of the wheel about the first axis of rotation is integrated into the wheel. For example, the components of the wheel positioning mechanism such as the motors, gears can be mounted to an inner hub or hub of the wheel. For the purpose of the present invention, the wheel comprises a wheel hub.

The present invention provides a method of controlling the movement of a load handling device of the present invention on a grid structure comprising a plurality of grid members arranged in a grid pattern, comprising the steps of rotating each wheel of the first or second set of wheels about its respective second axis of rotation so as to raise or lower the respective wheels relative to the vehicle body and engage or disengage the first set of wheels with the first set of grid members or the second set of wheels with the second set of grid members.

The method further comprises steps of
i) lowering the first set of wheels by rotating each wheel of the first set of wheels about its respective second axis of rotation so that each wheel of the first and second set of wheels is engaged with the first set of grid members and the second set of grid members respectively;
ii) raising the second set of wheels by rotating each wheel of the second set of wheels about its respective second axis of rotation to disengage each wheel from the second set of grid members.

Before the second set of wheels are raised, all of the first and second set of wheels are initially engaged with their respective first and second set of grid members. This mitigates the need for any one of the first or second set of wheels to bear the weight of the load handling device when raising or lowering their respective wheels, otherwise the second driving mechanism would need to provide sufficient torque to lift the load handling device, which can weigh up to 210 kg.

Preferably, the method further comprises the steps of locking each wheel of the first set of wheels or the second set of wheels in the raised and/or lowered position relative to the vehicle body. The wheel positioning mechanism can comprise a locking mechanism, e.g. solenoid, to lock the first or second set of wheels in the lowered or raised position relative to the vehicle body. For example, the locking mechanism can be actuated to lock a respective wheel when rotated about the second axis of rotation at a first angle of rotation representative of a raised (stowed) position and a second angle of rotation representative of a lowered (deployed) position.

The present invention further provides a storage system comprising:

i) a grid structure comprising a plurality of grid members arranged in a grid pattern for guiding the movement of a load handling device on the grid structure;

ii) a plurality of stackable containers located below the grid structure, wherein each of the plurality of stackable containers occupies a single grid space or grid cell;

iii) a load handling devices according the present invention, the load handling device being remotely operated on the grid structure to move one or more containers and further comprising:

i) a container-receiving space located above the grid structure; and ii) a lifting device arranged to lift a single container from a stack into the container-receiving space.

The grid structure can be supported by a plurality of upright members to form a grid framework structure discussed above with reference to FIGS. 1 to 3 and described in PCT Publication No. WO2015/185628A (Ocado), the contents of which are hereby incorporated by reference.

The lifting device can comprise a lifting drive assembly and a grabber device configured, in use, to releasably grip a container and lift a container from the stack into the container-receiving space and a driving mechanism operatively arranged for moving the load handling device on the grid structure.

The present invention provides a vehicle comprising i) a vehicle body, ii) a set of wheels arranged to support the vehicle body, each wheel of the set of wheels rotatable about a respective first axis of rotation and a respective second axis of rotation, wherein the respective second axis of rotation is radially offset from the respective first axis of rotation;

iii) a drive mechanism for driving the rotation of the set of wheels about their respective first axes of rotation;

wherein each wheel of the set of wheels comprises a wheel positioning mechanism configured to rotate at least one wheel about its respective second axis of rotation to selectively lower or raise the at least one wheel relative to the vehicle body.

The wheel positioning mechanism comprises the wheel positioning mechanism described above with reference to the load handling device.

BRIEF DESCRIPTION OF THE DRAWINGS

Further features and aspects of the present invention will be apparent from the following detailed description of an illustrative embodiment made with reference to the drawings, in which:

FIG. 11 is a schematic perspective view of the drive mechanism and wheel positioning mechanism according to a first embodiment of the present invention.

FIG. 12 is a schematic perspective (a) rear view and (b) cross sectional view of the drive mechanism and wheel positioning mechanism according to a second embodiment of the present invention.

FIG. 24 is a schematic front and side view of the drive mechanism and wheel positioning mechanism according to a ninth embodiment of the present invention in (a) lowered and (b) raised positions.

FIG. 25 is a schematic front view of the drive mechanism and wheel positioning mechanism according to a ninth embodiment of the present invention in (a) lowered and (b) raised positions.

FIG. 26 is a schematic front and side view of the drive mechanism and wheel positioning mechanism according to a tenth embodiment of the present invention in (a) lowered and (b) raised positions.

FIG. 28 is a schematic view of a locking mechanism applied to the ninth embodiment of the present invention.

DETAILED DESCRIPTION

Figure 1:
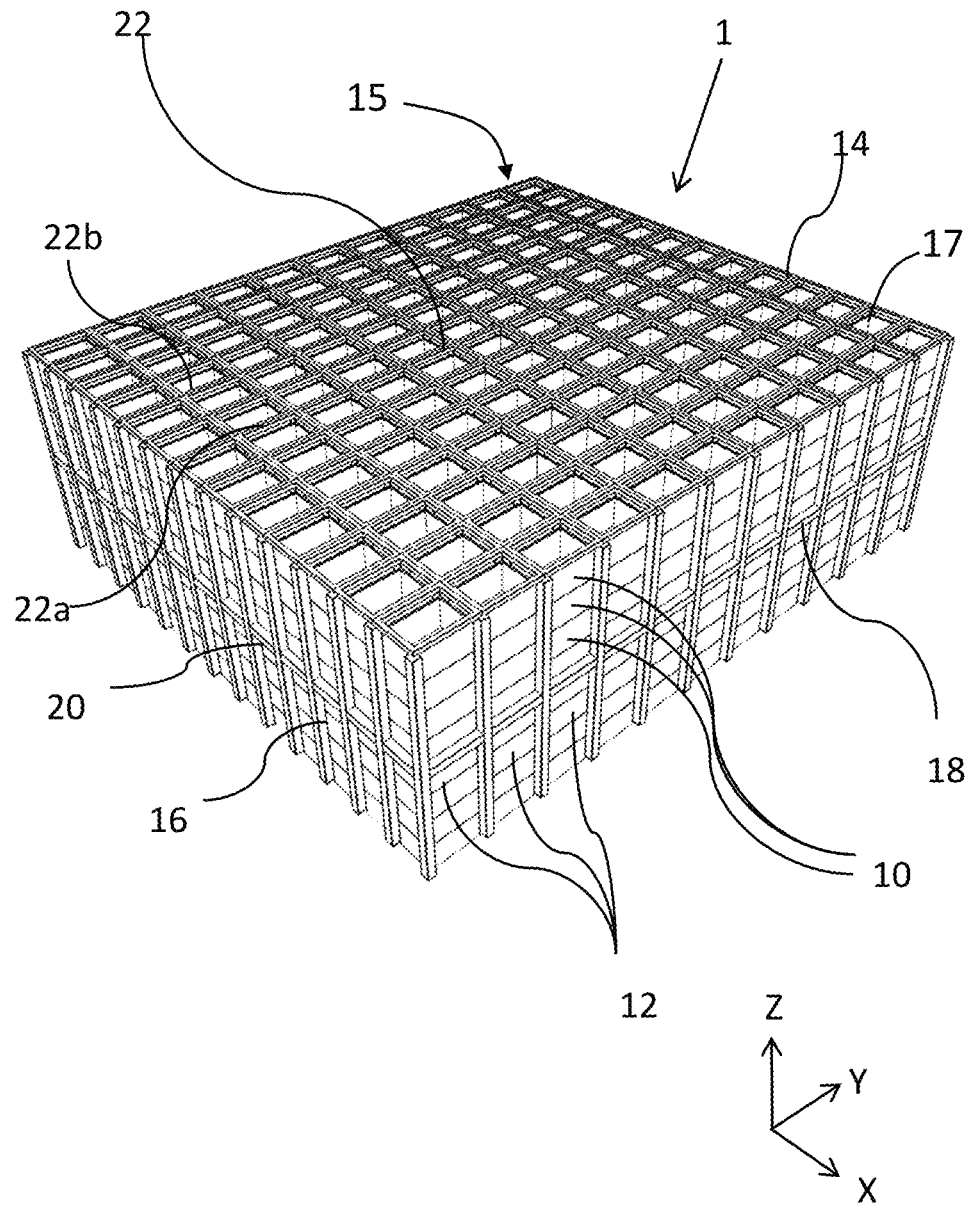
FIG. 1 is a schematic diagram of a grid framework structure according to a known system.
Figure 2:
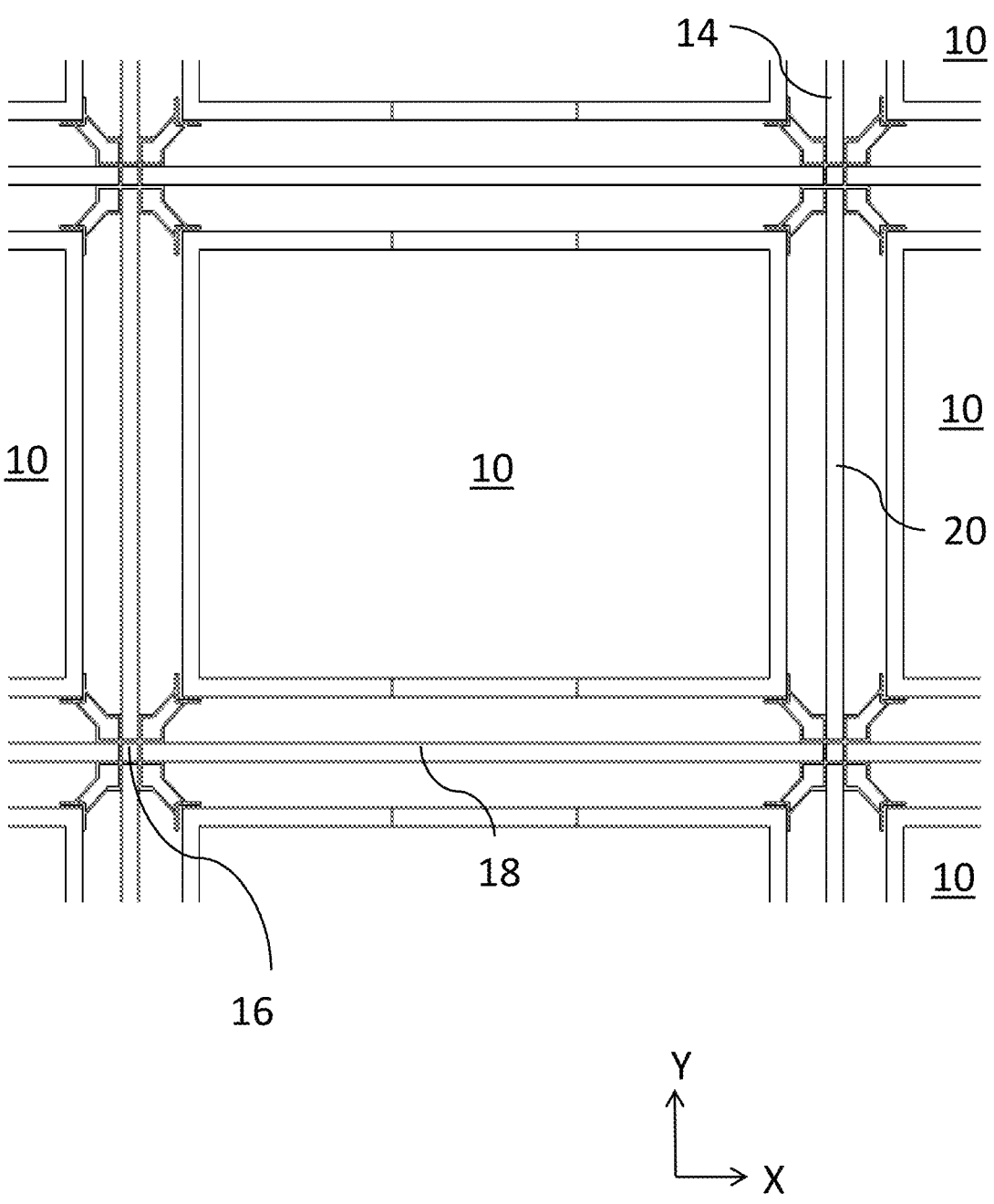
FIG. 2 is a schematic diagram of a top down view showing a stack of bins arranged within the framework structure of FIG. 1.
Figure 3:
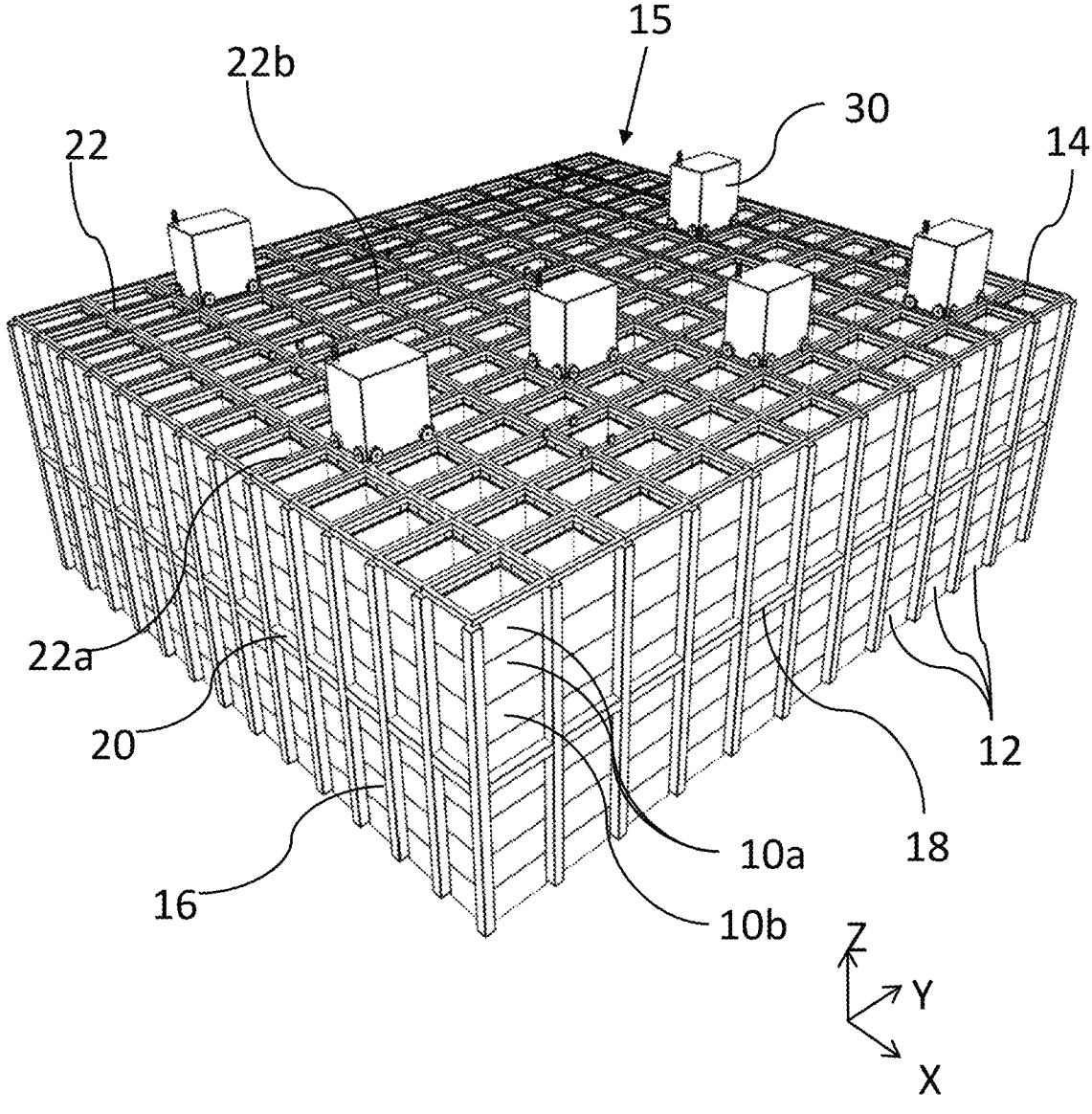
FIG. 3 is a schematic diagram of a known storage system showing a load handling device operative on the grid framework structure.

It is against the known features of the storage system such as the grid framework structure and the load handling device described above with reference to FIGS. 1 to 5, that the present invention has been devised. FIG. 6 shows a load handling device 130 according to an embodiment of the present invention and described in International patent application WO 2015/140216 (Ocado Innovation Limited), the contents of which are incorporated herein by reference. The load handling device 130 comprises a vehicle body 132 equipped with a lifting mechanism (not shown) comprising a winch or a crane mechanism to lift a storage container or bin, also known as a tote, from above. The crane mechanism comprises a winch cable wound on a spool or reel and a grabber device. The grabber device is configured to grip the top of the container to lift it from a stack of containers in a storage system of the type shown in FIGS. 4 and 5.

The vehicle body 132 comprises an upper part and a lower part. The lower part is fitted with two sets of wheels 134, 136 configured to run on rails at the top of the grid framework structure of a storage system. For the purpose of explanation of the present invention, the two sets of wheels are defined as a first set of wheels 134 and a second set of wheels 136. The first 134 and second 136 sets of wheels are arranged around the periphery of the load handling device 130 in the lower part. Each of the first 134 and second 136 sets of wheels are arranged on opposing sides in the lower part of the vehicle body 132. Each of the first and second sets of wheels comprises a pair of wheels on opposing sides of the vehicle body, i.e. each of the first and second sets of wheels comprises four wheels in total. In the particular embodiment of the present invention shown in FIG. 6, each wheel of the first 134 and second 136 sets of wheels is rotatably mounted to a vehicle frame in the lower part of the vehicle body 132 so as to enable movement of the load handling device in X and Y directions respectively along the tracks or rails. Whilst the particular embodiment of the present invention shows pairs of wheels mounted to opposing side of the vehicle body, the present invention is not restricted to the load handling device comprising pairs of wheels mounted on either side of the vehicle body. Thus, instead of a pair of wheels mounted to opposing sides of the vehicles, stability of the load handling device can be achieved by at least one wheel on opposing sides of the vehicle body and which are arranged to be diagonally opposed to each other. Thus, the first and second sets of wheels each comprises at least one wheel mounted to opposing sides of the vehicle body such that they are diagonally opposed to each other.

Figure 4:
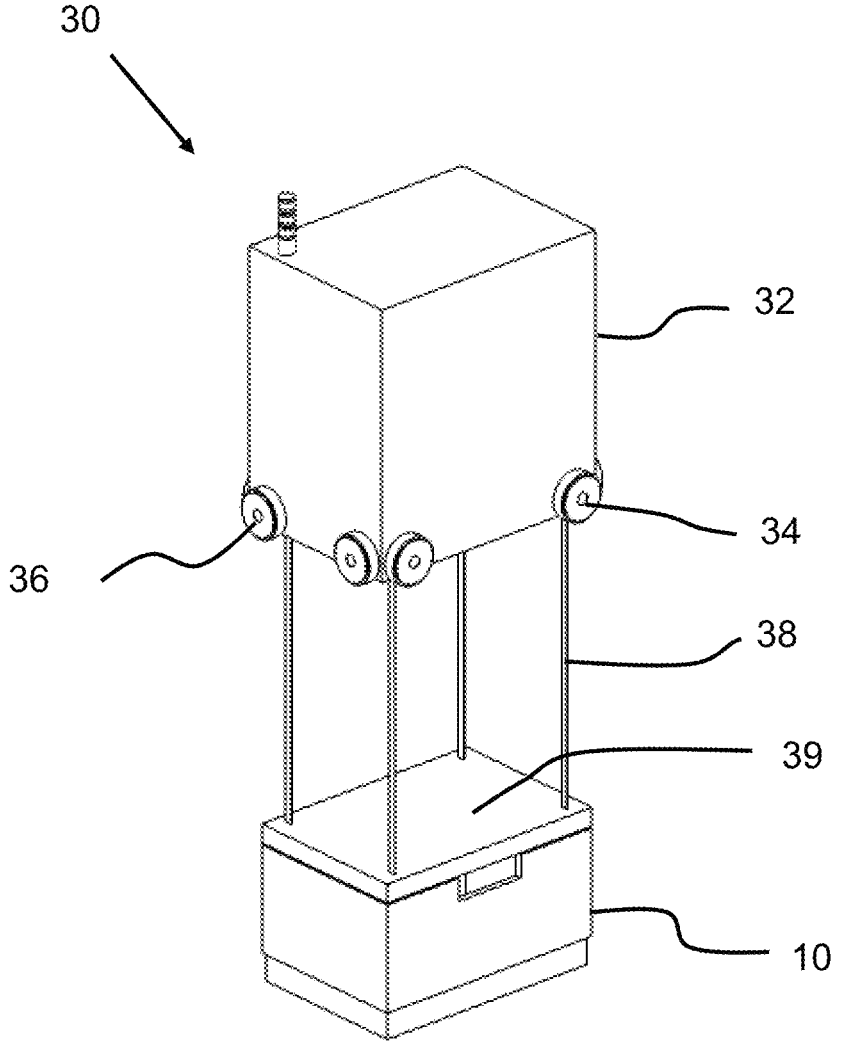
FIG. 4 is a schematic perspective view of the load handling device showing the lifting device gripping a container from above.
Figure 5:
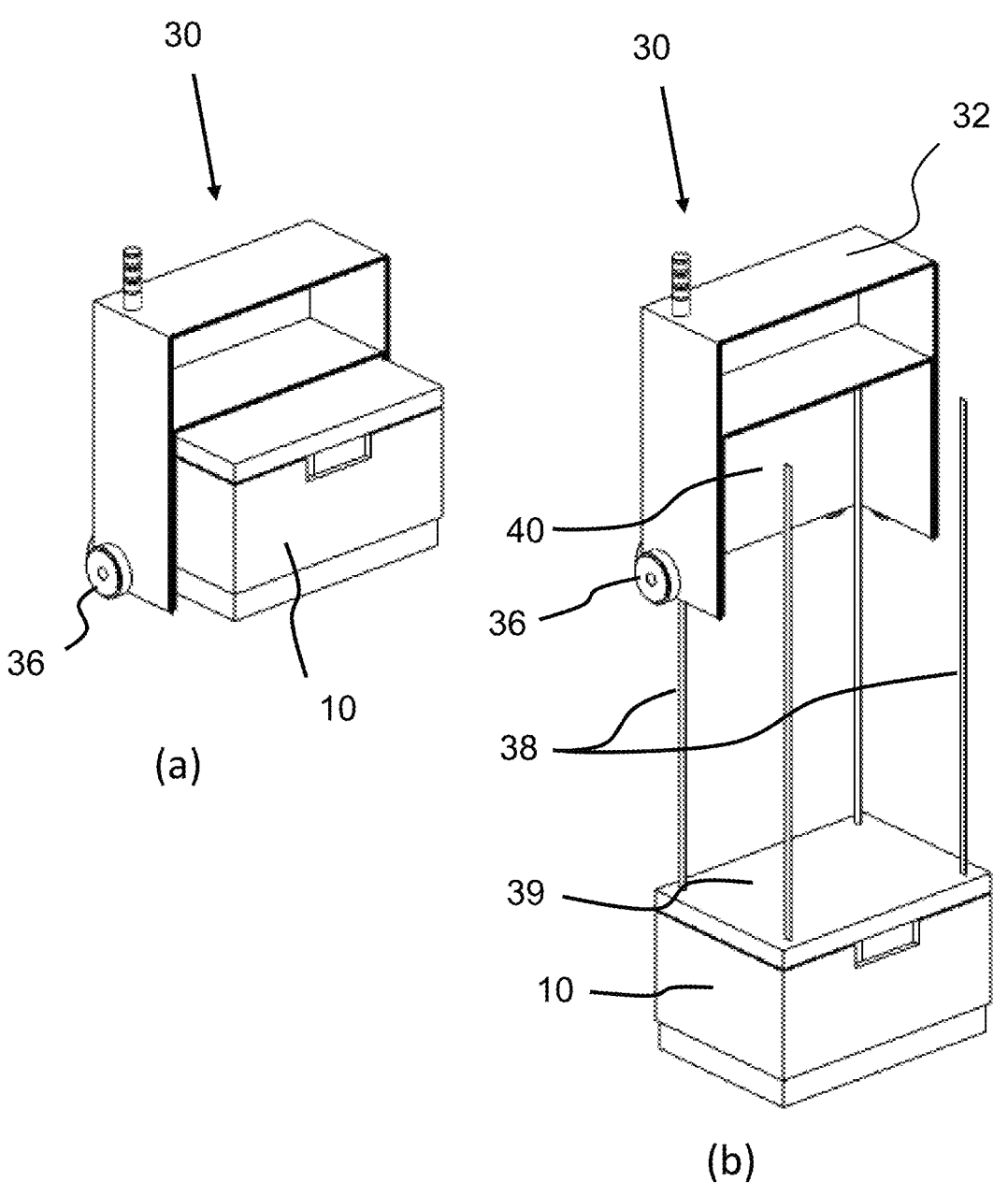
FIG. 5 are schematic perspective cut away views of the load handling device of FIG. 4 showing (a) a container accommodated within the container receiving space of the load handling device, and (b) the container receiving space of the load handling device
Figure 6:
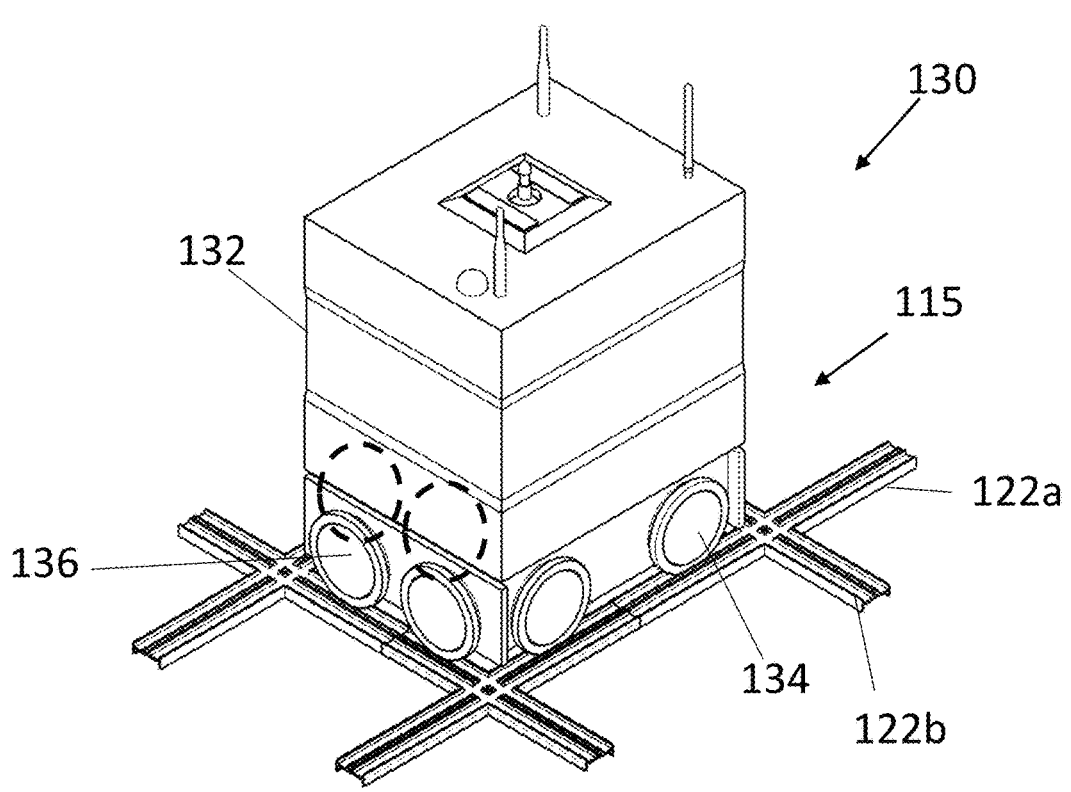
FIG. 6 is a schematic perspective view of a load handling device on a grid structure according to an embodiment of the present invention.

In the particular embodiment of the present invention, the first 134 and second 136 sets of wheels are arranged around the periphery of a cavity or recess, known as a container-receiving recess or container receiving space 40, in the lower part (see FIGS. 4 and 5). The recess is sized to accommodate a container 10 when it is lifted by the crane mechanism, as shown in FIG. 5 (a and b). Whilst the particular embodiment describes the container receiving space arranged within the vehicle body, e.g. as described in WO 2015/019055 (Ocado Innovation Limited), the vehicle body may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

The upper part of the vehicle body 132 may house a majority of the bulky components of the load handling device. Typically, the upper part of the vehicle houses a driving mechanism for driving the lifting mechanism together with an on-board rechargeable power source for providing the power to the driving mechanism and the lifting mechanism. The rechargeable power source can be any appropriate battery, such as, but not limited to, lithium batteries or even a capacitor.

Figure 7:
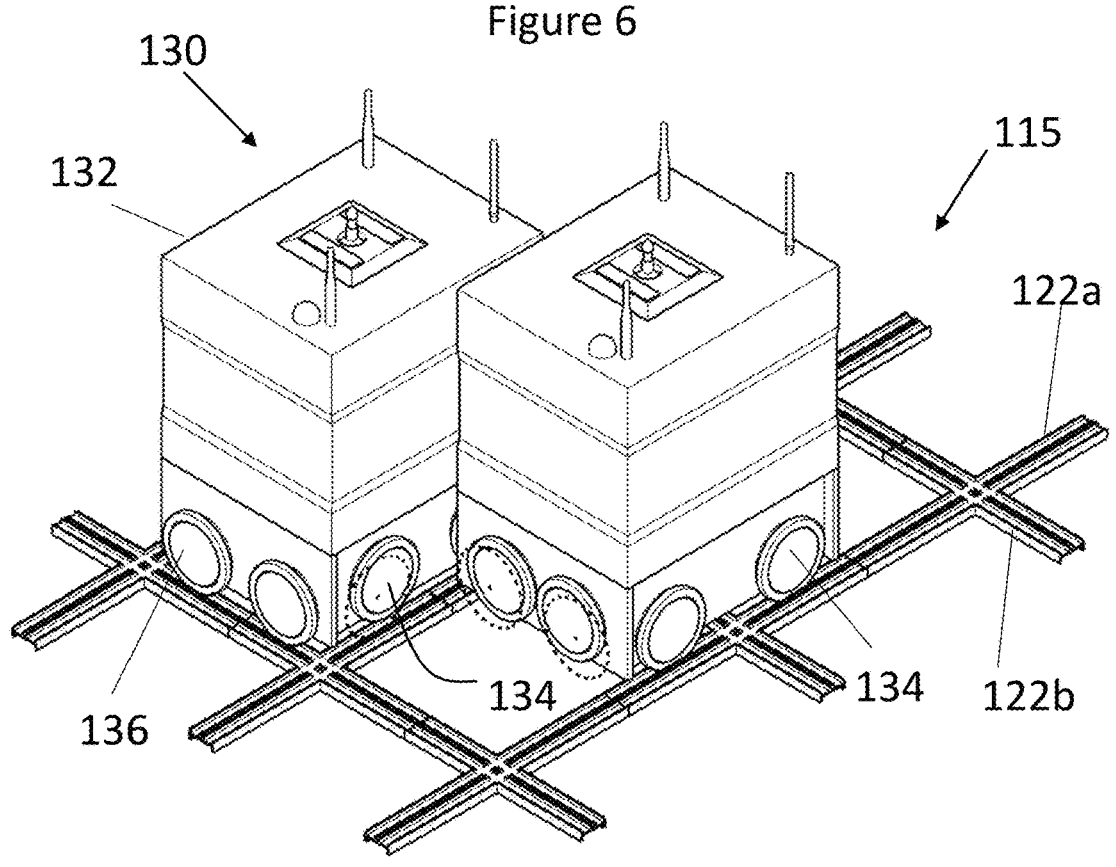
FIG. 7 is a schematic perspective view of two load handling devices side-by-side on a double track of the grid structure according to an embodiment of the present invention.

As shown in FIGS. 6 and 7, the grid structure 115 comprises a first set of parallel grid members extending in a first direction and the second set of grid members extending in a second direction arranged in a grid pattern comprising a plurality of cells. For ease of explanation of the present invention, movement of the load handling device in the horizontal plane in the first direction represents movement in the X-direction and movement in the second direction represents movement in the Y direction on the grid structure. To permit one or more load handling devices to travel on the grid structure, the first set of grid members comprises a first set of tracks 122a and the second set of grid members comprises a second set of tracks 122b. Optionally, the first set of grid members comprises a first set of track supports (not shown) and the second set of grid members comprises a second set of track supports (not shown). Optionally, the first set of tracks 122a are snap fitted to the first set track supports and the second set of tracks 122b are snapped fitted to the second set of track supports. Equally plausible in the present invention is that the plurality of tracks 122a, 122b can be integrated into the first and second sets of track supports such that the grid members of the grid structure comprise both the tracks and the track support.

The first 134 and second 136 sets of wheels are arranged to be moved vertically to lift each of the sets of wheels clear of their respective tracks or rails, thereby allowing the vehicle to move in the desired direction. As shown in FIGS. 6 and 7, to change direction on the grid structure 115 (e.g. to change from the X-direction to the Y-direction), the first set of wheels 134 are lifted clear of the first set of grid members or tracks 122a and the second set of wheels 136 are engaged with the second set of grid members or tracks 122b. The dashed lines in FIGS. 6 and 7 show the position of a set of wheels 134, 136 from a lowered (deployed) position to a raised (stowed) position. The reverse is true when the load handling device is arranged to move in the other direction (e.g. to change from the Y-direction to the X-direction) on the grid structure 115 in that the first set of wheels 134 are lowered to be engaged with the first set of grid members or tracks 122a and the second set of wheels 136 are lifted clear from the second set of grid members or tracks 122b. The wheels are raised (stowed) or lowered (deployed) in synchronisation such that the first set of wheels 134 are raised or lowered in synchronization to disengage or engage with the grid members or tracks extending in the X-direction. Similarly, the second set of wheels 136 are raised or lowered in synchronization to disengage or engage with the grid members or tracks extending in the Y direction.

Figure 8:
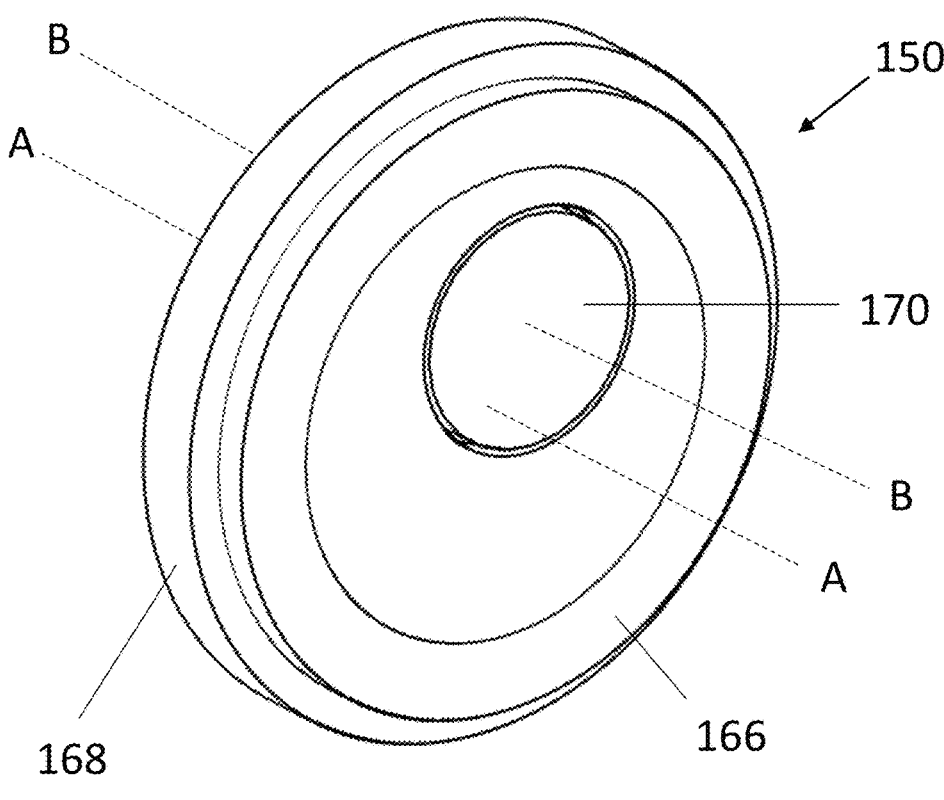
FIG. 8 is schematic perspective view of a wheel of the load handling device showing the two axes of rotation according to an embodiment of the present invention.

A driving mechanism (not shown) such as a motor drives either the first 134 or the second 136 set of wheels in the X direction or the Y direction on the grid structure 115. For example, each wheel of the first 134 and second 136 sets of wheels can by driven by individual hub motors in the lower part of the vehicle body 132 to provide four wheel drive capability of the load handling device 130 on the grid structure 115. In other words, all of the wheels in the first and second set of wheels are driven by individual hub motors. This is to allow the load handling device to be able to travel along the rails or tracks 122a, 122b on the grid structure 115 should any one of the wheels in the set 134, 136 slip on the rail or track. Thus, each of the wheels of the first 134 and second 136 set of wheels comprises the driving mechanism, e.g. a hub motor, to the drive the rotation of the wheels about their respective first axes of rotation, A-A (see FIG. 8). In other words, the driving mechanism can be integrated into the wheel such that the driving mechanism forms part of the wheel structure. FIG. 8 shows a perspective view of a wheel 150 of the load handling device 130 according to an embodiment of the present invention. The first axis of rotation A-A of each individual wheel corresponds to the rotation of the wheel 150 when the load handling device 130 is moving in a linear direction on the grid structure 115.

Figure 9:
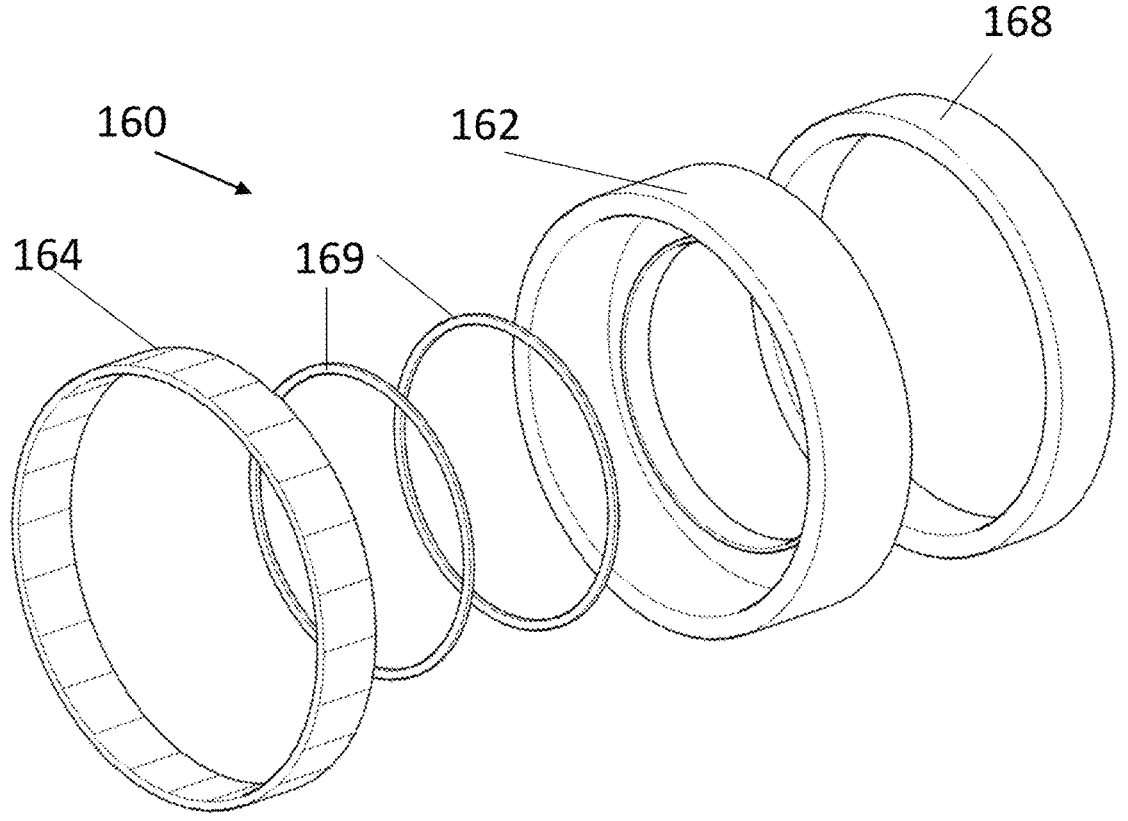
FIG. 9 is an exploded view of the hub motor used to the drive the wheel about the central axis of rotation according to an embodiment of the present invention.

In detail, the hub motor 160 shown in FIGS. 8 and 9 comprises an outer rotor 162 comprising an outer surface that is arranged to engage with the grid structure (e.g. tracks) and an inner surface comprising ring shaped permanent magnets 164 that is arranged to rotate around a wheel hub or inner hub 166 comprising the stator of the hub motor 160. Typically, the stator comprises the coils of the hub motor. To drive each wheel 150 of the first or second set of wheels, and thus move the load handling device in the first direction or the second direction on the grid structure, the outer rotor 162 of the hub motor 160 is arranged to rotate about a first axis of rotation A-A that corresponds to the central axis of a respective wheel. The outer surface of the rotor 162 can optionally comprise a tyre 168 for engaging with the tracks or rails. In the particular embodiment shown in FIG. 9, the outer rotor 162 rotates on bearings (not shown) about the first axis and comprises the outer rotor 162 on which the permanents magnets 164 are bonded to its inner surface. The tyre 168 is optionally located on the outside of the permanent magnets 164. Each of the wheels 150 is coupled to the vehicle body of the load handling device by coupling the inner hub or hub 166 comprising the stator of the hub motor to the vehicle body so as to allow the outer rotor 162 to rotate relative to the wheel hub 166. Whilst the particular embodiment describes the drive mechanism of each of the wheels 150 of the first 134 and second 136 set of wheels comprising a hub motor to provide the motive power to drive the load handling device on the grid structure, other means to rotatably drive the outer rotor 162 about the wheel hub 166 are applicable in the present invention. The other examples of driving an outer rotor 162 around the wheel hub 166 will become more apparent later in the description. Also shown in FIG. 8 are optional seals 169 to prevent ingress of foreign bodies or contaminants entering the wheel hub 166 or leakage of lubrication from the wheel.

Figure 10:
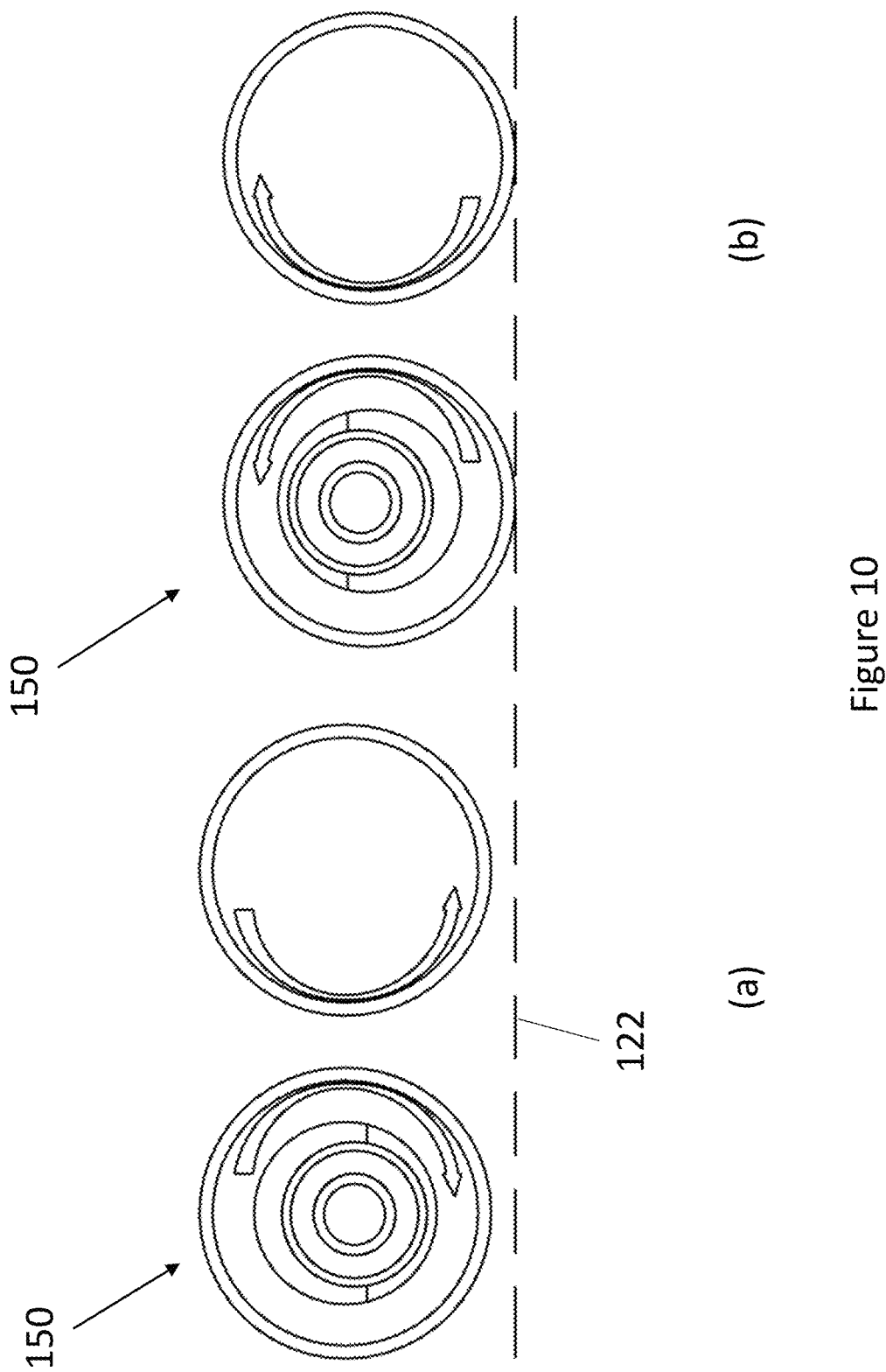
FIG. 10 is a schematic representation of a pair of wheels of the wheel assembly in (a) raised (stowed) position to disengage with the grid structure; and (b) lowered (deployed) position to engage with the grid structure.

To lift either the first 134 or second 136 sets of wheels when changing direction on the grid structure, each wheel 150 of the first and second sets of wheels is configured to rotate about a second axis of rotation, B-B, that is offset from the first axis of rotation, A-A, i.e. rotate about an eccentric axis. Thus, each wheel 150 of the first and second sets of wheels is arranged to rotate about two axes of rotation, the first A-A and second B-B axis of rotation. Rotating the wheel 150 eccentrically in one direction raises the wheel 150 and rotation in the other direction lowers the wheel 150. This is demonstrated in FIG. 10 showing schematic drawings of a pair of wheels 150 of one set of wheels rotating in one direction about their respective second axes of rotation to (a) raise the wheels and thus disengage with the grid members or tracks 122a, 122b, and in the other direction to (b) lower the wheels 150 to engage with the grid members or tracks 122a, 122b. The arrows in FIG. 10 show the direction of rotation of the respective wheels to move from (a) a raised state (stowed) to (b) a lowered state (deployed). This could either be in a clockwise or anti-clockwise direction. Each wheel 150 of the first and second sets of wheels comprises a wheel positioning mechanism that is arranged to rotate the respective wheels 150 about their second axes of rotation B-B. Having a wheel assembly whereby the motive power to drive the wheel 150 on the grid structure 115 about the first axis of rotation A-A is provided by an outer rotor 162 rotatable around an inner hub or wheel hub 166 offers the flexibility to rotate the wheel 150 about the second axis of rotation, namely an eccentric axis. The wheel positioning mechanism comprises a second motor or second driving mechanism 170 (see FIG. 8) to drive the wheel 150 to rotate about the second axis of rotation B-B. The first motor providing the motive force to drive the wheel about the first axis of rotation A-A can be a hub motor 160 as described above. The second motor 170 is mounted to the vehicle body of the load handling device offset from its first axis of rotation (central axis) so as to provide the lifting action of the wheel when the second motor 170 is powered. More specifically, the stator of the second motor 170 is mounted to the vehicle body via a housing coupling whilst its rotor forms part of the inner hub or hub 166 of the wheel 150. Mounting the second motor or housing coupling of the second motor provides the necessary anchorage or leverage when the wheel is rotated about the second axis of rotation B-B.

As the rotor of the second motor is rotated, the inner hub 166, and thus the wheel 150, rotates about the second axis of rotation causing a lifting action. The wheel positioning mechanism can be envisaged to be an actuator that actuates the raising and lowering of the wheel 150 by rotating the wheel about its respective second axis of rotation, B-B. The operation of the wheel positioning mechanism will soon become apparent below from the different examples of rotating the wheel about a first A-A and second B-B axis of rotation. For the purpose of explanation of the present invention, the drive mechanism and the wheel positioning mechanism described for one wheel 150 can be applied to all of the wheels in the first 134 and second set 136.

Figures 11, 12:
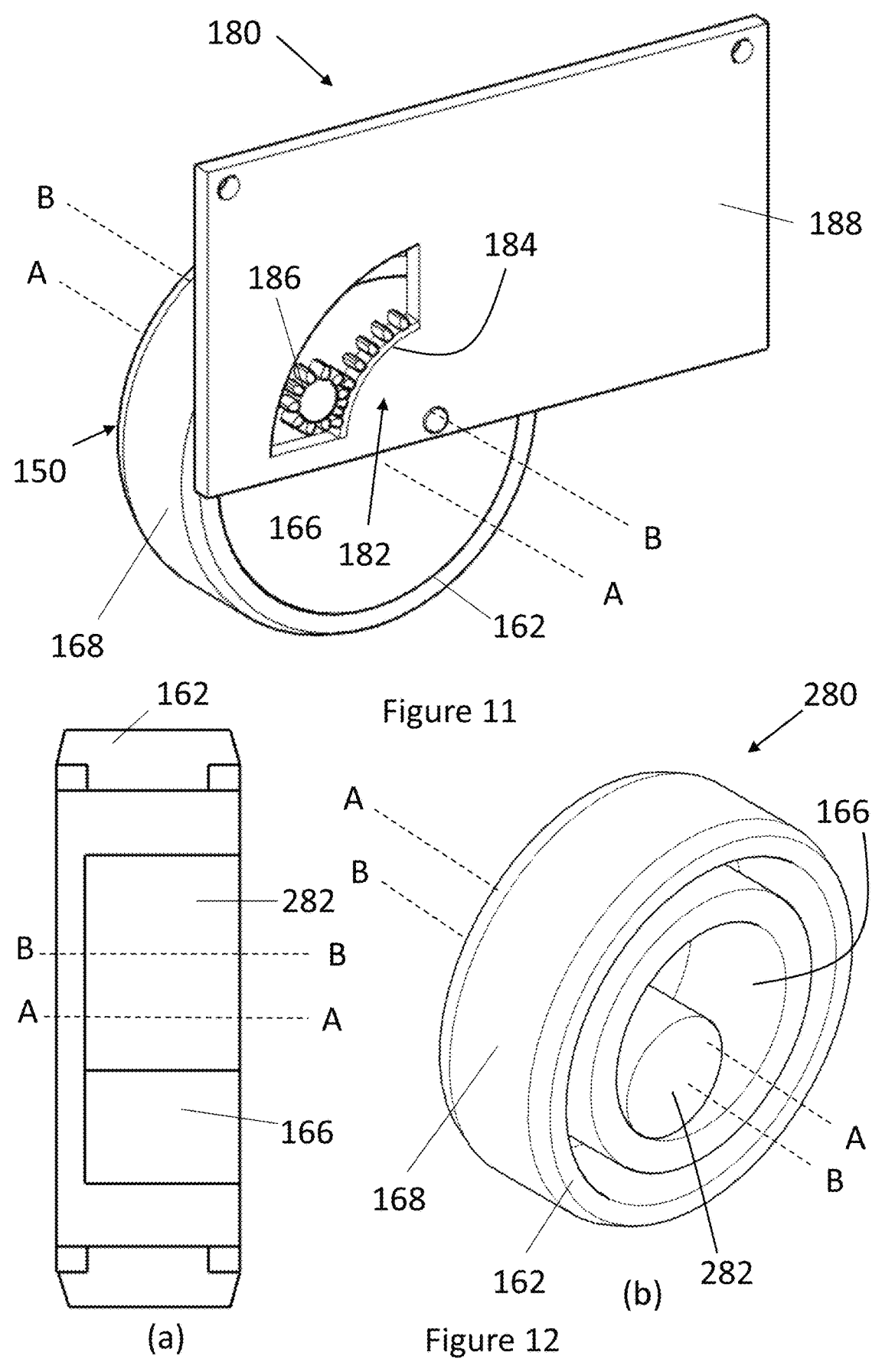

In a first embodiment of the present invention shown in FIG. 11, the wheel positioning mechanism 180 of an individual wheel comprises a rack and pinion gear mechanism 182 comprising a curved rack 184 having a plurality of teeth and a pinion gear 186 rotatably mounted on the curved rack 184 so that the teeth of the pinion gear 186 mesh with the plurality of teeth of the curved rack 184. The curved rack 184 is shown mounted offset to the central rotational axis, A-A, of the wheel 150 so that the pinion gear 186 rotates or travels through an arc around the curved rack 184 about a rotational axis that is offset from the central rotational axis A-A of the wheel 150. In the particular embodiment shown in FIG. 11, the wheel 150 is eccentrically coupled or mounted to a mounting plate 188 that forms part of the vehicle body or chassis of the load handling device and the pinion gear 186 is mounted to the wheel 150, more specifically to the inner hub or hub 166 of the wheel 150. The wheel 150 is mounted to the plate 180 such that the pinion gear 186 is able to rotate around the curved rack 184 mounted to the mounting plate 188. The pinion gear 186 travels around the curved rack 184 about an axis B-B (eccentric axis) that corresponds to the second axis of rotation B-B to raise and lower the wheel 150; the central rotational axis corresponds to the first axis of rotation, A-A. The radius of curvature of the curved rack 184 determines the degree of lift of the wheel 150. The mounting plate 188 can optionally comprise an arcuate opening 190 so as to accommodate the travel of the pinion gear 186 around the curved rack 184. In the particular embodiment of the present invention, the pinion gear 186 is driven by a motor (second motor) integrated within the wheel, more specifically within the inner hub or hub 166 of the wheel 150, around the curved rack 184; the first motor being the motor to drive the wheel about the first axis of rotation, A-A, e.g. hub motor. The same lifting action of the wheel can be achieved by rotating the curved rack 184 relative to the pinion gear 186. The wheel 150 is driven in a linear direction by an outer or external rotor 162 mounted to the outer circumference of the inner hub or hub 166 and is rotatable about an axis of rotation that corresponds to the first axis of rotation, A-A. The outer rotor 162 can be driven by a motor (first motor) separate to the motor (second motor) driving the pinion gear 186. For example, the motor (first motor) driving the outer rotor 162 can optionally be a hub motor as discussed above.

In a second embodiment of the present invention shown in FIG. 12, the wheel positioning mechanism 280 comprises a motor (second motor) 282 that is mounted offset to the first axis of rotation A-A, more specifically the motor 282 comprise a drive shaft that is mounted to the wheel offset of the first axis of rotation so as to rotate the wheel about the second axis of rotation B-B. As with the first embodiment of the present invention, the motor (second motor) 282 for rotating the wheel about the second axis of rotation can be integrated within the inner hub 166 of the wheel 150. The wheel 150 is mounted to the vehicle body, more specifically to the vehicle chassis, by the second motor 282 to provide the necessary leverage to lift and lower the wheel 150. Also, as with the first embodiment of the present invention, the wheel 150 is driven in a linear direction by an outer or external rotor 162 mounted to the outer circumference of the inner hub 166 and is rotatable about an axis of rotation that corresponds to the first axis of rotation, A-A, e.g. hub motor. In comparison to the first embodiment of the present invention, the second embodiment of the present invention does not utilise gears to lift the wheel (i.e. rotate about the second axis of rotation). Instead, the second embodiment of the present invention comprises a first motor, e.g. a hub motor, to drive an outer or external rotor as discussed above, and a second motor 282 eccentrically mounted to the wheel 150 so as to rotate the wheel about an offset axis that corresponds to the second axis of rotation, B-B.

In a third embodiment of the present invention, the outer or external rotor 262 for driving the wheel 150 about the first axis of rotation A-A is driven by a rack and pinion gear combination rather than a hub motor as discussed above. The outer or external rotor 262 has an outer surface that is arranged to engage with the track or rail of the grid structure or an optional tyre and an inner surface comprising a plurality of teeth (not shown) that extend around the inner circumference of the outer rotor to form an annular gear. A pinion gear 384 driven by a separate motor (first motor) 386 internally of the outer rotor 262 meshes with the plurality of teeth of the inner surface of the rotor or annular gear 262 to cause the wheel 150 to rotate about the first axis of rotation A-A. In other words, the pinion gear 384 driven by the first motor 386 is used drive the rotation of the outer rotor or annular gear 262 about the first axis of rotation. As with the second embodiment of the present invention shown in FIG. 12, the wheel positioning mechanism 380 comprises a separate motor (second motor) 382 that is mounted offset from the first 'central' axis of rotation, so that the drive shaft of the second motor 382 mounted to the wheel 150 rotates the wheel about an eccentric axis or second axis of rotation, B-B. The second motor 382 is mounted to the vehicle body or chassis of the load handling device having a drive shaft mounted to the wheel so as to rotate the wheel about the second axis of rotation, B-B. In comparison to the second embodiment of the present invention shown in FIG. 12, the outer rotor 262 is driven by a rack and pinion gear combination rather than a hub motor. The first 386 and second 382 motor and the pinion gear 384 are integrated within the wheel, more specifically housed within the hub 166 of the wheel 150.

Figures 13, 14:
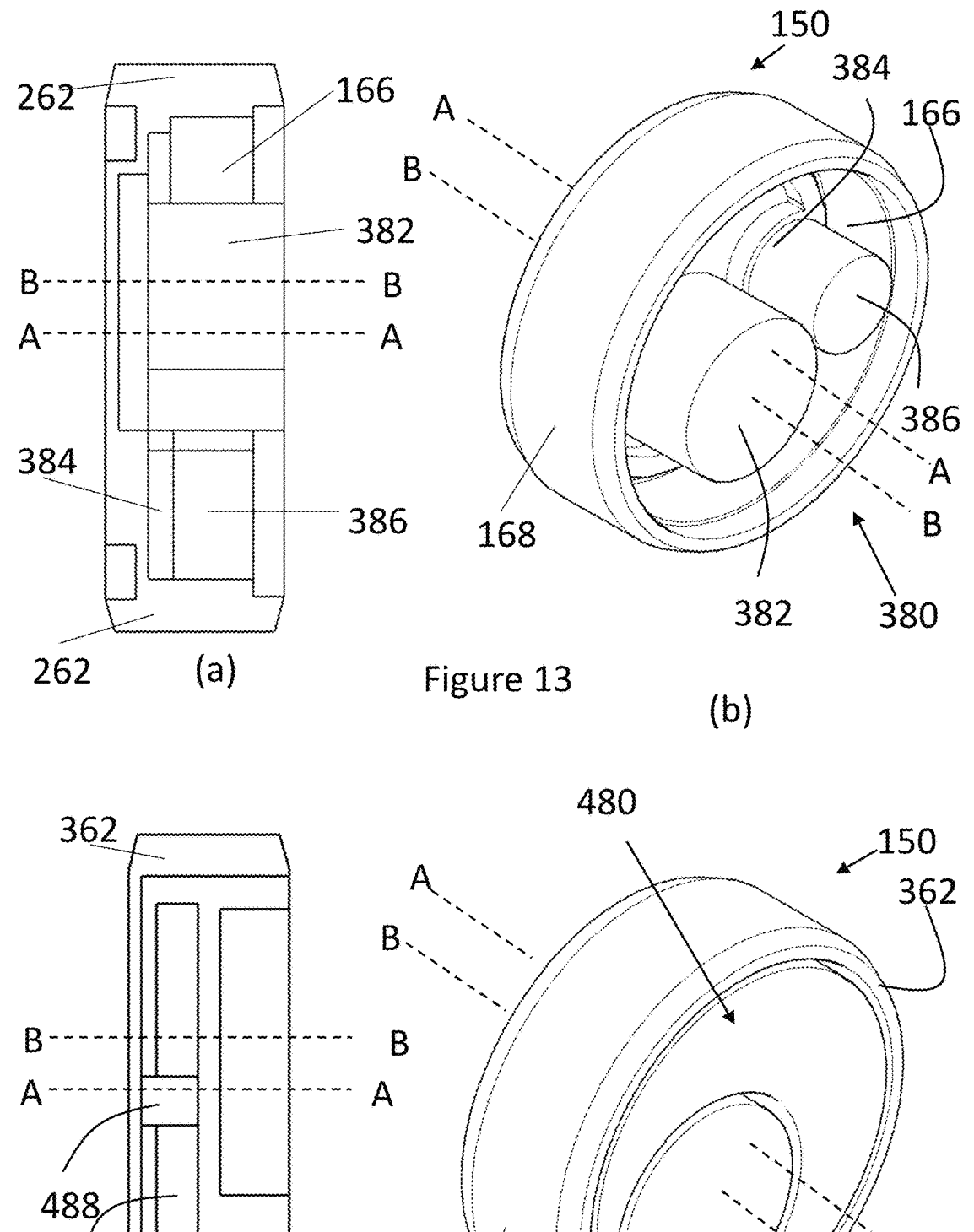
FIG. 13 is a schematic perspective (a) rear view and (b) cross sectional view of the drive mechanism and wheel positioning mechanism according to a third embodiment of the present invention.
FIG. 14 is a schematic perspective (a) view and (b) cross sectional view of the drive mechanism and wheel positioning mechanism according to a fourth embodiment of the present invention.

In comparison to the first and second embodiment of the present invention respective in FIGS. 11 and 12, in a fourth embodiment of the present invention shown in FIG. 14, the outer rotor 362 is driven by an inner rotor type motor 486 (first motor) rather than an hub motor. Rather than an outer rotor being moveable relative to an inner stator as in a hub motor, the outer, ring shaped permanent magnet stays static (stator) and an inner metallic core rotates (rotor) inside it. The inner metallic core or rotor drives a drive shaft 488. The outer rotor 362 is mounted to the drive shaft 488 such that outer rotor 362 of the wheel 150 is driven by the drive shaft 488. The inner rotor type motor 486 is mounted to the wheel such that the drive shaft 488, and thus the wheel, is driven about the first axis of rotation A-A to move the load handling device in the first or second direction. As with the second embodiment of the present invention, the wheel positioning mechanism 480 of the wheel comprises a separate motor (second motor) 382 mounted offset from the wheel central axis (first axis of rotation) having a drive shaft to rotate the wheel about the second axis of rotation, B-B. Like with the first, second and third embodiment of the present invention, the inner rotor type motor 486 for providing the motive power to drive the load handling device on the grid structure and the separate motor (second motor) 382 configured to raise and lower the wheel can optionally be integrated into the wheel, more specifically housed within the hub 166 of the wheel.

Figures 15, 16:
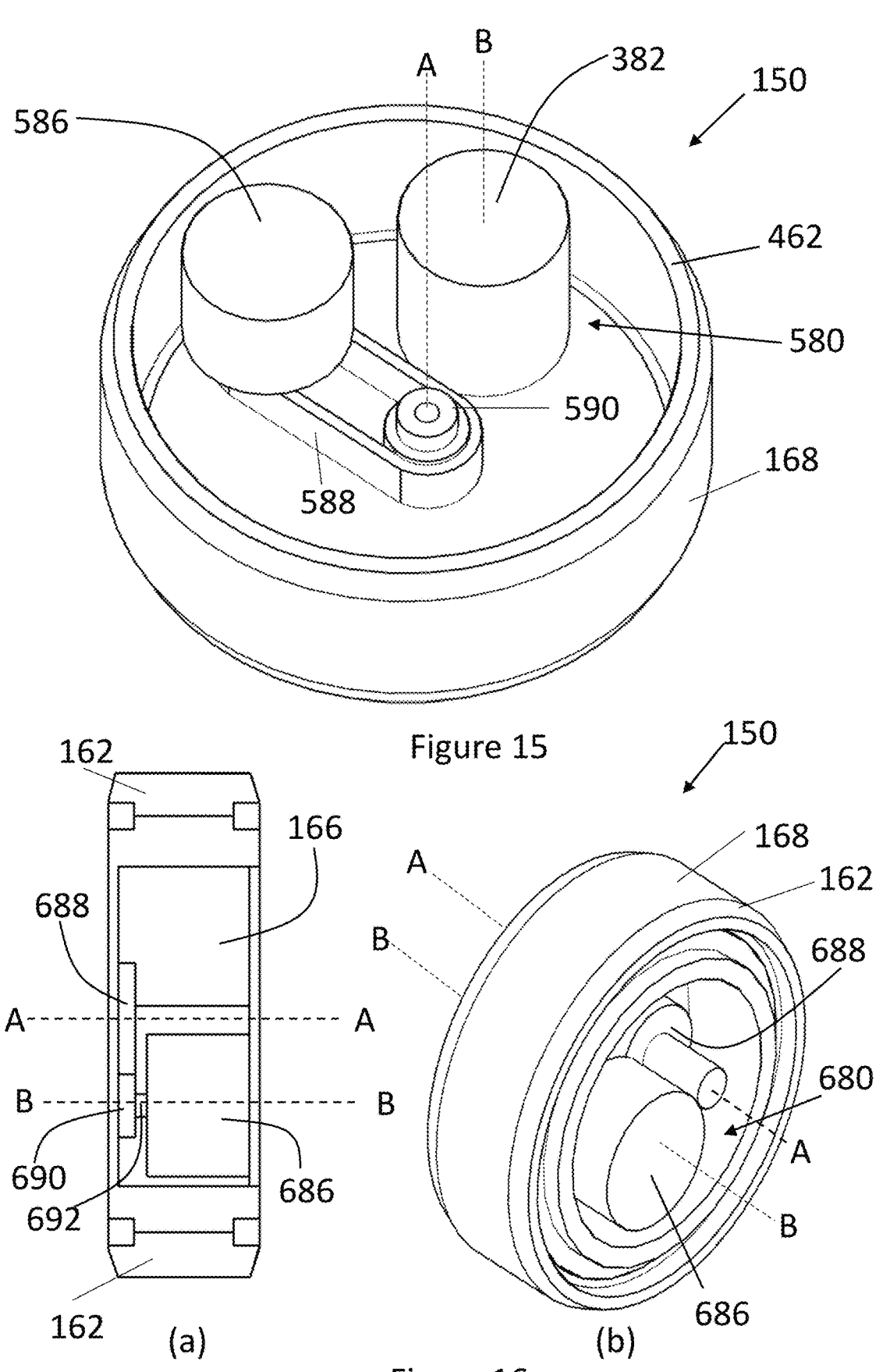
FIG. 15 is a schematic perspective view of the drive mechanism and wheel positioning mechanism according to a fifth embodiment of the present invention.
FIG. 16 is a schematic perspective (a) rear view and (b) cross sectional view of the drive mechanism and wheel positioning mechanism according to a sixth embodiment of the present invention.

In a fifth embodiment of the present invention shown in FIG. 15, the outer rotor 462 of the wheel 150 is driven by a toothed belt 588 coupled to a motor 586 mounted offset from the wheel centre axis rather than a hub motor. As shown in FIG. 15, the toothed belt 588 extends around a sprocket 590 mounted on a central drive shaft of the wheel 150 so as to be driven by the motor 586 about the wheel central axis, A-A (first axis of rotation). As with the second embodiment of the present invention, the wheel positioning mechanism 580 of the wheel comprises a separate motor (second motor) 382 mounted offset from the wheel central axis (first axis of rotation) having a drive shaft to rotate the wheel about the second axis of rotation, B-B.

In a sixth embodiment of the present invention shown in FIG. 16, the wheel positioning mechanism 680 comprises a planetary gear mechanism or an epicyclical gear comprising a planetary gear 688 rotatably engageable or meshed with a sun gear 690. The sun gear 690 is driven by a motor (second motor) 686 mounted offset from the wheel central axis so as to rotate about an axis offset from the wheel central axis, i.e. rotatable about the second axis of rotation, B-B for raising and lowering the wheel. In other words, the planetary gear 688 engaged with the sun gear 690 is driven around the centre of the sun gear 690. Since the sun gear 690 is offset from the central rotational axis of the wheel and the planetary gear 688 is mounted to the wheel, rotation of the planetary gear 688 around the sun gear 690 raises or lowers the wheel 150. In the particular embodiment of the present invention, the sun gear 690 is driven by a drive shaft 692 of the second motor 686 and the planetary gear 688 is mounted to the wheel 150 so that rotation of the planetary gear 688 around the sun gear 690 driven by the second motor 686 raises or lowers the wheel 150. The planetary gear 688 is shown mounted to the centre of the wheel, i.e. the first axis of rotation. The second motor 686 offset from the wheel central axis is mounted to the vehicle body or chassis so as to provide the necessary leverage to permit the wheel to rotate around the sun gear 690 as a result of the planetary gear 688 rotating about the second axis of rotation. The planetary gear mechanism can be envisaged to function similarly to the rack and pinion gear mechanism described with reference to the first embodiment of the present invention shown in FIG. 11 where the sun gear 690 functions as a pinion gear that rotates around a lift gear 688 (the planetary gear) mounted to the wheel hub. The second motor 686 drives the rotation of the pinion gear 690.

Like the first embodiment of the present invention, the wheel in the sixth embodiment of the present invention is driven around the first axis of rotation, A-A, by a hub motor comprising an outer, ringed shaped permanent magnet that rotates around a stator. Like with the first, second and third embodiment of the present invention, the epicyclical gear is integrated into the wheel, more specifically within the hub 166 of the wheel.

Figure 17:
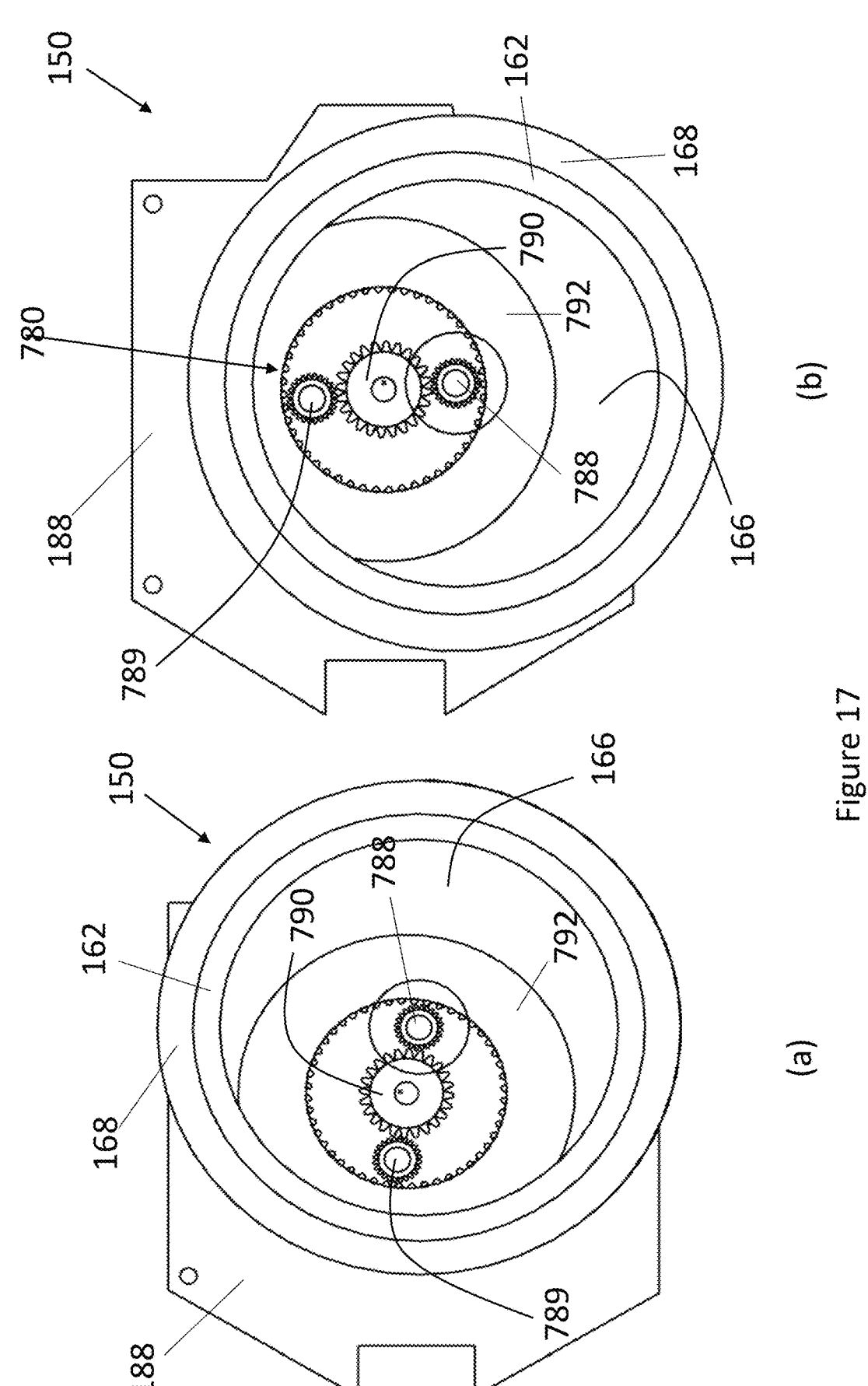
FIG. 17 is a schematic perspective view of the drive mechanism and wheel positioning mechanism according to a seventh embodiment of the present invention.

An extension to the use of the epicyclical gear to position the wheel relative to the vehicle body is described by a seventh embodiment of the present invention shown in FIG. 17. In the seventh embodiment of the present invention shown in FIG. 17, the planetary gear 788 is arranged to rotate around the centre of the sun gear 790. The wheel 150 is mounted to the planetary gear 788 so that rotation of the planetary gear 788 rotates the wheel and since the planetary gear 788 rotates around the sun gear 790 about an offset axis (second axis of rotation, B-B), the wheel is arranged to rotate around the second axis of rotation to raise or lower the wheel 150. In the comparison to the sixth embodiment of the present invention, the epicyclical gear or planetary gear mechanism further comprises an annular gear 792. The centre of the annular gear 792 is coaxial with the rotational axis of the sun gear 790 and since the rotational axis of the sun gear 790 corresponds to the second axis of rotation, the centre of the annular gear 792 is coaxial with the second axis of rotation, B-B. The inner surface of the annular gear 792 comprises a plurality of radial teeth and since the planetary gear 788 is driven by the sun gear 790, the planetary gear 788 is arranged to rotate around the inner surface of the annular gear 792 by the sun gear 790 about the second axis of rotation, B-B. In the particular embodiment of the present invention shown in FIG. 17, the annular gear 792 is fixed to the vehicle body or chassis. In the particular embodiment of the present invention shown in FIG. 17, the annular gear 792 is mounted to a mounting plate 188 which in turn is mounted to the vehicle body. Similarly, the sun gear 790 is rotatably mounted to the vehicle body or chassis or mounting plate 188. Rotation of the sun gear 790 is driven by a motor (second motor), preferably within the vehicle body. The planetary gear 788 mounted to the wheel 150 (more specifically to the wheel hub 166) and driven by the sun gear 790 is arranged to cause the wheel 150 to rotate about the second axis of rotation, B-B.

Also shown in FIG. 17 is a second planetary gear 789 arranged to rotate around the sun gear 790, the first planetary gear 788 being mounted to the wheel 150, more specifically at the centre of the wheel. The second planetary gear 789 symmetrically balances the weight of the first planetary gear 788 as they are both driven around the sun gear 790. The secondary planetary gear 789 is rotatably mounted to the vehicle body, more specifically to the mounting plate 188. The annular gear 792 is configured to keep both the planetary gears 788, 789 (first and second planetary gears) into engagement with the sun gear 790. The different rotational positions of the planetary gears 788, 789 around the sun gear 790 is shown in FIG. 17 (a and b). In the first position of the planetary gears 788, 789 shown in FIG. 17(*a*), the planetary gears 788, 789 are rotated to an angle around the sun gear 790 such that the wheel is in a raised position so as to disengage from the grid member or track; in this case, 90° to the vertical or at 3 o'clock. In the second position of the planetary gear shown in FIG. 17(*b*), the planetary gears 788, 789 are rotated in a clockwise direction by 90° around the sun gear 790 such that the wheel is in a lowered position so as to engage with the grid member or track; in this case 1800 to the vertical or at 6 o'clock.

Figure 18:
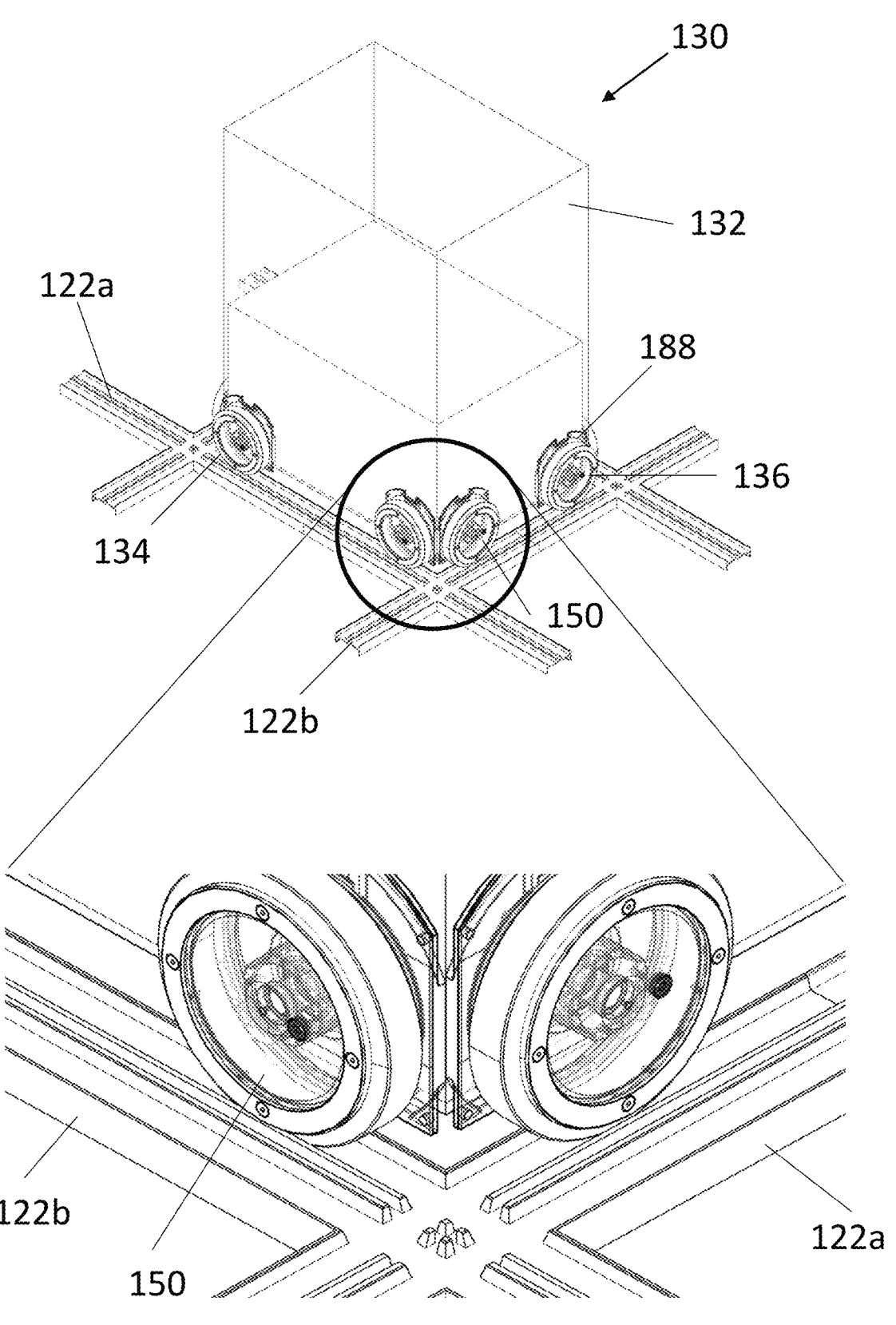
FIG. 18 is a schematic perspective view of the load handling device on the grid structure where the motive power is provided by each of the wheels shown in FIG. 17.

The first 134 and second 136 sets of wheels are shown in FIG. 18 mounted to opposing sides of the vehicle body 132 of the load handling device 130. Each of the first and second sets of wheels provides the motive power to drive the load handling device in the first direction or second direction on the grid structure. Each wheel of the first and second sets of wheels comprises a wheel positioning mechanism described above to actuate the wheel in a first, lowered position relative to the vehicle body to engage with the grid member or track or a second, raised position relative to the vehicle body to disengage with the grid member or track. Each wheel of the first and second set of wheels is mounted to the vehicle body. In the particular embodiment of the present invention shown in FIG. 18, each wheel is mounted to a mounting plate 188 which is fixed to the vehicle body 132. The tracks 122*a*, 122*b* shown in FIG. 18 are double tracks whereby load handing devices can pass each other side-by-side as demonstrated in FIG. 7. However, the load handling device is not limited to being operative on a double track grid structure and can operate on a single track grid structure.

The wheel positioning mechanism can be configured so that the second axis of rotation is radially offset from the first 'central' axis of rotation of the wheel in the range 10 mm to 30 mm, more preferably, 10 mm to 15 mm. For example, where the second 'lift' motor's centre of rotation (second axis of rotation) is offset from the central axis (first axis of rotation) of the wheel by 10 mm, this allows the wheel to move in a Z-axis a maximum of 20 mm when the second 'lift' motor has rotated a full 180°.

Figure 19:
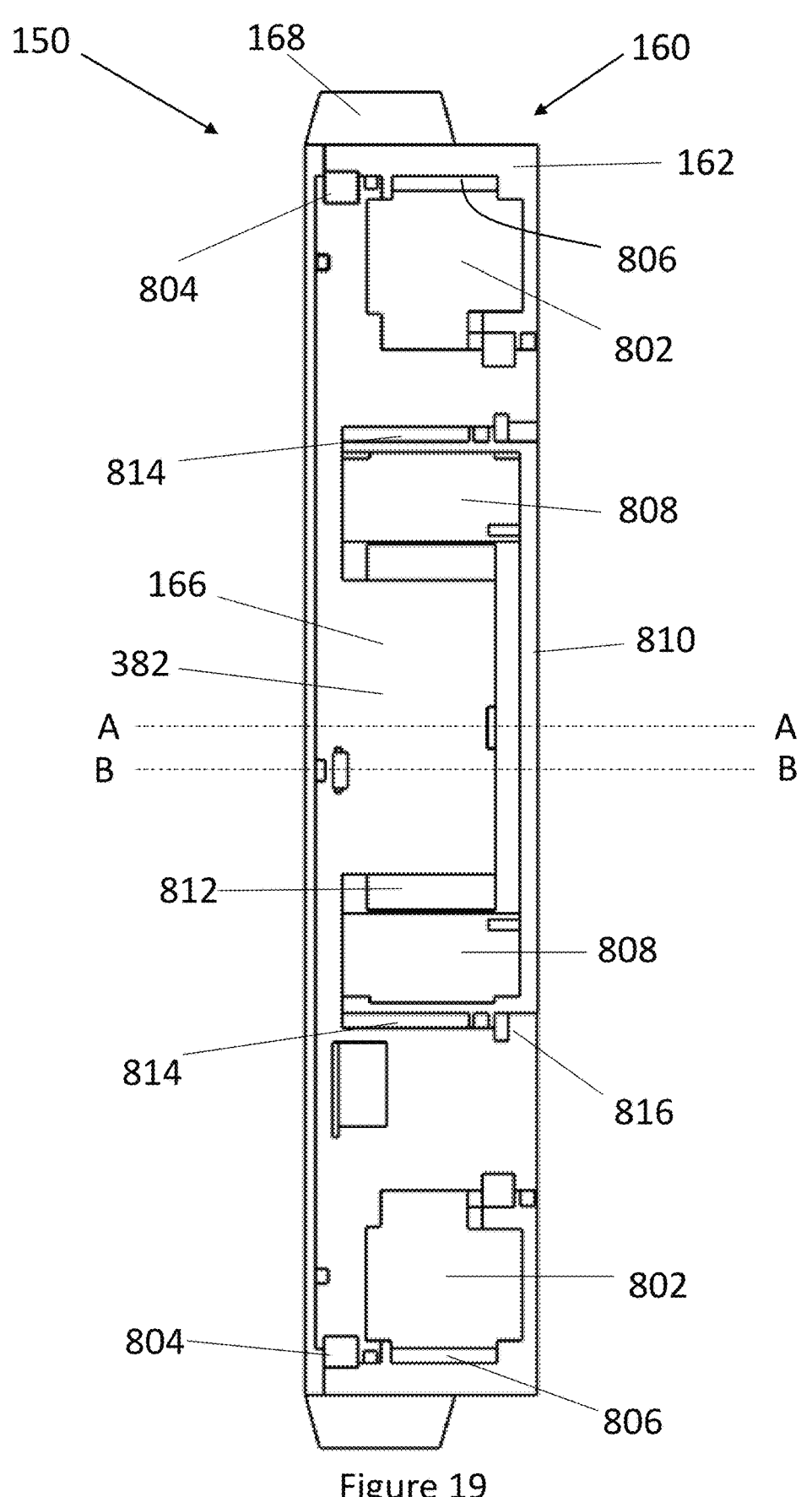
FIG. 19 is a schematic perspective cross-sectional view of a wheel comprising the driving mechanism and wheel positioning mechanism according to an eighth embodiment of the present invention.
Figure 20:
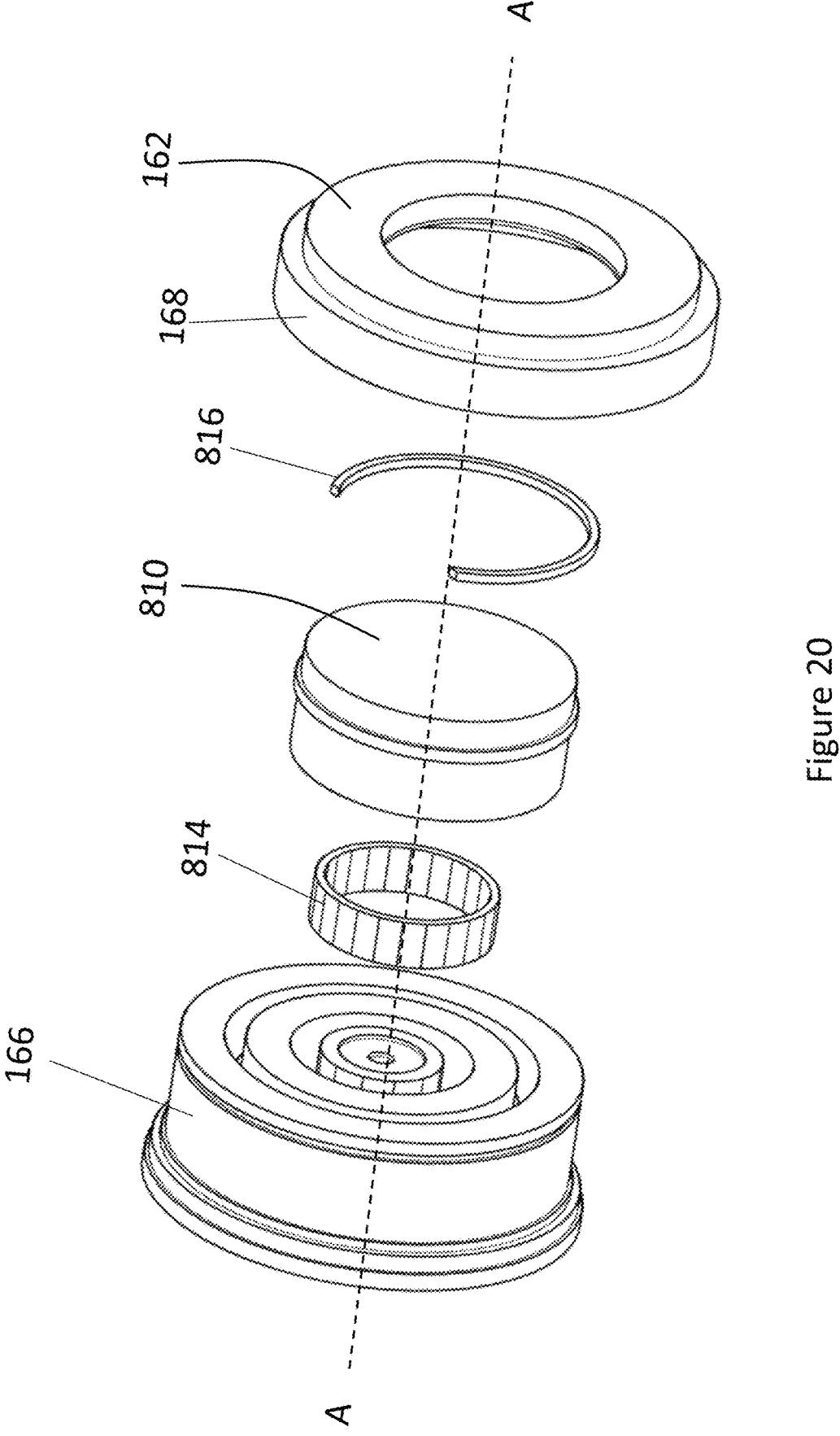
FIG. 20 is an exploded view of the wheel shown in FIG. 19 according to the eighth embodiment of the present invention.

Different combinations of the driving mechanism for driving the outer rotor about the first axis of rotation and the wheel positioning mechanism for rotating the wheel about the second axis of rotation described in the first, second, third, fourth, fifth, sixth, and seventh embodiments of the present invention are applicable in the present invention. For example, a combination of the drive mechanism comprising a hub motor for driving rotation of the wheel about the first 'central' axis (first axis) and a wheel positioning mechanism comprising a second motor mounted offset from the first 'central' axis of the wheel as described in the second embodiment of the present invention shown in FIG. 13 falls within the scope of the present invention. An example of the different combinations of the drive and wheel positioning mechanism is shown in the cross sectional view of the wheel 150 shown in FIG. 19 and the exploded view of the wheel 150 is shown in FIG. 20.

The wheel 150 comprises two integrated motors (first and second motors) mounted both on and within the wheel hub. The first motor, a hub motor, 160 is mounted on the external rim of the wheel hub and provides the motive power to drive the load handling device on the grid structure about the first axis of rotation. The stator 802 of the hub motor 160 shown is mounted to the wheel hub 166 and the outer rotor 162 is fixed to the tyre 168 rim. A drive motor stator 802 is bonded to the surface of the wheel hub 166 and provide means to rotate the outer wheel surface or outer rotor 162 about the wheel hub 166. A pair of wire race bearings 804 can optionally be located either side of the stator 802 which locate the rotating outer surface or outer rotor 162. The outer rotor 162 rotates on the race bearings 804 about the first axis of rotation, A-A and can comprise a steel rotor on which the permanent magnets 806 are attached or bonded to the inside of circumference of the rotor 162. Also shown in FIG. 19 is the second motor or lift motor 382 that provides the lifting action of the wheel. The stator 808 of the second motor 382 is fixed to the vehicle body or chassis of the load handling device via a housing coupling cup 810 whilst its rotor 812 forms part of the wheel hub 166. The lift or second motor stator 808 is bonded into a central bore of the housing coupling cup 810. As a result, the rotor 812 of the second motor 382 rotates relative to its stator 808 and thus, the housing coupling cup 810. A roller bearing 814 such as a needle roller bearing is shown interposed between the housing coupling cup 810 and the wheel hub 166. A snap ring 816 shown can optionally be used to retain the second motor 382 to the wheel hub 166. The lift motor or second motor 382 is positioned offset from the central first axis of the wheel so as to provide the lifting action as the rotor 812 is turned about the second axis of rotation.

Whilst the different embodiments of the present invention describe two electric motors (first and second motors) to respectively drive a wheel about its first axis of rotation and second axis of rotation, the wheel can be driven about its first and second axis of rotation by a single motor. For example, a single motor can drive the sun gear in the sixth embodiment of the present invention shown in FIG. 16 to drive rotation of the planetary gear about the first and second axes of rotation. The planetary gear is mounted at the central axis of the wheel or wheel hub so as to rotate about the first axis of rotation. The planetary gear is passive so as to be driven about the wheel central axis (first axis of rotation) by the sun gear and provide the motive power to move the load handling device in linear direction on the grid structure. To rotate the wheel about the second axis of rotation, a locking mechanism is configured to prevent the planetary gear rotating about its own axis. Rotation of the sun gear would then drive the planetary gear to rotate about the centre of the sun gear and since, the centre of the sun gear is at the second axis of rotation would cause the planetary gear to be lifted as it is rotated around the sun gear. In other words, the planetary gear is forced to travel around the circumferential arc of the sun gear. Thus, a single motor driving the sun gear can be used to drive the planetary gear to rotate about the first and second axis of rotation.

In addition to the wheel positioning mechanism configured to raise or lower the wheel to respectively disengage or engage the wheel from the grid members or tracks, the wheel positioning mechanism can optionally comprise a locking mechanism that is configured to hold the wheel in the raised (stowed) position or the lowered (deployed) position when the load handling device is being driven in a first or second direction on the grid structure. Depending on whether the first set of wheels are engaged with the first set of grid members or whether the second set of wheels are engaged with the second set of grid members, the relevant wheels are rotated in a clockwise or anti-clockwise direction about their respective second axis of rotation to raise or lower the wheel relative to the vehicle body. Once the final position of the wheels is reached, the locking mechanism is actuated to hold the wheels in either the raised or lowered position, and thereby prevent the wheels from re-engaging with the grid member or track (when in a raised position) or disengaging with the grid member or track (when in a lowered position). Examples of locking mechanisms to hold the wheel in a raised or lowered position include but are not limited to a solenoid, electromagnet holding brake etc. For the purpose of explanation, the operation of the locking mechanism will be explained with reference to the example of the wheel shown in FIG. 19 comprising a hub motor to drive rotation of the wheel about the first axis of rotation and a separate motor mounted offset to the first axis to drive rotation of the wheel about the second axis of rotation.

Figure 21:
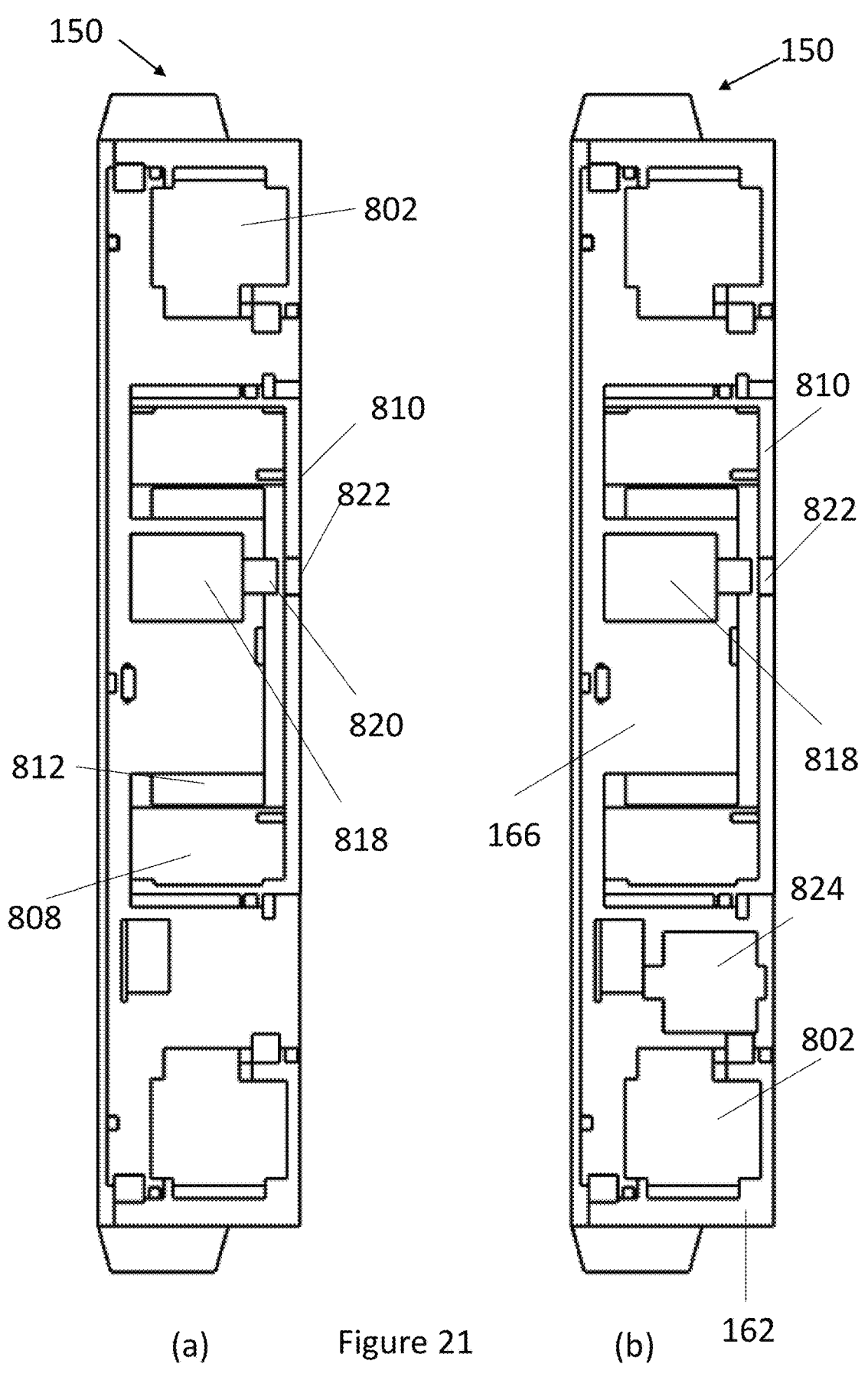
FIG. 21 is a schematic perspective cross-sectional view of a wheel showing (a) shot-bolt solenoid locking mechanism for locking the second 'lift' motor; and (b) shot-bolt solenoid locking mechanism for locking the first 'drive' motor according to a first embodiment of the present invention.

In the particular embodiment shown in FIG. 21(*a*) which is based on the wheel shown in FIG. 19, the locking mechanism for the holding the wheel in a raised or lowered position comprises a shot-bolt solenoid 818 comprising an extendible armature or rod 820 that is arranged to be received in a latching hole 822 in the housing coupling cup 810. The shot-bolt solenoid 818 is mounted adjacent the lift or second motor 382, more particularly within the housing coupling cup 810, so its armature arm 820 is configured to engage with an aperture 820 in the housing coupling cup 810, and thereby prevent rotation of the rotor 812 relative to its housing coupling cup 810 and thus stator 808 attached thereto. In operation, the armature arm 820 of the shot-bolt solenoid 818 is actuated to extend so as to be receivable in the aperture 822 of the housing coupling cup 810 and thereby, prevent rotation of the rotor 812 relative to the housing coupling cup 810 and since the stator 808 is bonded to the housing coupling cup 810, also relative to the stator 808. In addition to having a locking mechanism to lock rotation of the wheel about the second axis of rotation to raise (lift) or lower the wheel relative to the vehicle body, the wheel can optionally comprise a second locking mechanism 824 to prevent rotation of the outer rotor 162 about the first axis of rotation that drives the wheel on the grid member or track. The second locking mechanism 824 shown in FIG. 21(*b*) can optionally be based on the shot-bolt solenoid used to hold the wheel in the raised or lowered position discussed above. The armature of the shot-bolt solenoid is configured to prevent rotation of the outer rotor 162 relative to the wheel hub 166 housing the stator 802 of the first motor (see FIG. 21*b*).

Figure 22:
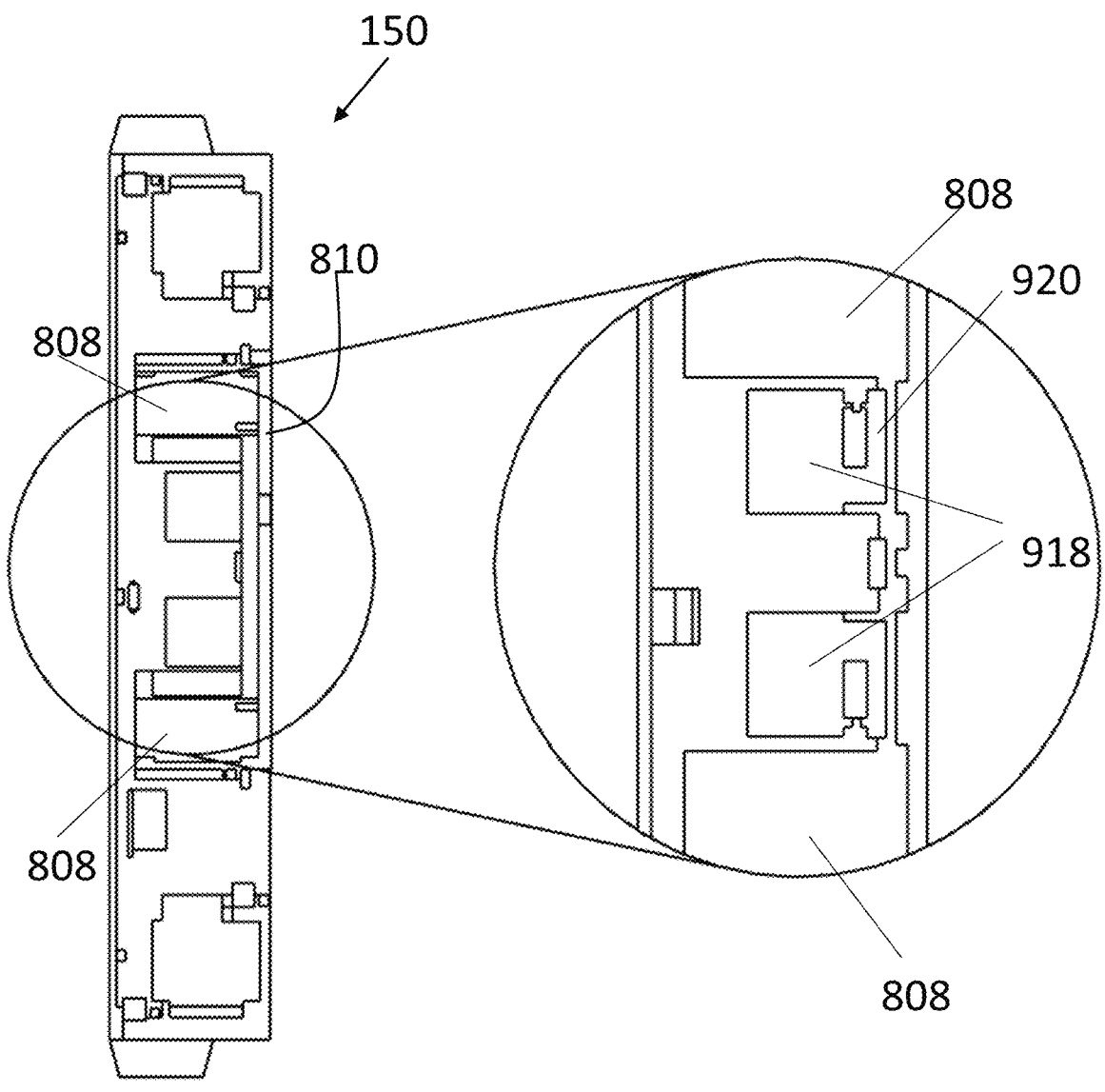
FIG. 22 is a schematic perspective cross-section view of a wheel showing an electromagnetic holding locking mechanism according to a second embodiment of the present invention.

Another example of the locking mechanism for holding the wheel in a raised or lowered position is shown in FIG. 22 and is based on the use of an electromagnetic holding brake 918 so as to transmit a torque mechanically by utilising either a direct electromagnetic force or a spring actuated force to create a mechanical friction. The rotating portion of the electromagnetic brake comprises an armature assembly 920 that is pulled and attached to the stator of the second motor by energisation of a coil. A constant force plate spring transfers torque to prevent the rotor of the second motor rotating relative to its stator 808 which is attached to the housing coupling cup 810. Other examples of a locking mechanism to hold the wheel in a raised and/or lowered position by cooperating with the housing coupling cup fixed to the stator of the second motor 382 are applicable in the present invention.

In a ninth embodiment of the present invention shown in FIGS. 24(a and b) and 25(a and b), the wheel positioning mechanism 980 comprises a belt or chain 982. The belt or chain 982 passes around a pair of wheels 150 and a sprocket 984. The sprocket 984 is arranged in the same plane as the pair of wheels 150 on a side of the load handling device 30. The wheels 150 each have a cylindrical projection or wheel sprocket 986, arranged concentric with the wheel. The wheel sprockets 986 may be integral with the wheels 150, or may be a separate part attached to the wheels by any suitable fastening means. The sprocket 984 and the wheel sprockets 986 of the pair of wheels have external teeth, which engage with the links or teeth of the belt or chain 982. Each wheel 150 is attached to the side of the load handling device 30 by means of a mounting plate 992.

The wheel sprockets 986 are configured to rotate about an eccentric axis 988, when driven by the chain or belt 982. The mounting plate 992 is mounted to the side of the load handling device 30, and the wheel 150 is pivotally connected to the mounting plate so that the wheel can rotate about the eccentric axis 988. Rotation of the wheel sprockets 986 about the eccentric axis 988 causes the wheels 150 to be raised or lowered relative to the tracks 22. A motor 990 may be used to drive the sprocket 984, which drives the belt or chain 982, which in turn drives the wheel sprockets 986 about their eccentric axes 988 to raise or lower the wheels 150 relative to the tracks 22.

In FIG. 24(a) the wheel positioning mechanism 980 is shown in the lowered state, with the wheels 150 engaged with the track 22 below. In FIG. 24(b) the wheel positioning mechanism 980 is shown in the raised state, with the wheels 150 disengaged from the track 22 below. In the particular embodiment illustrated in FIG. 24(a and b), the wheels 150 have been rotated by about 60° anticlockwise about the eccentric axis 988 between the lowered state in FIG. 24(a) and the raised state in FIG. 24(b). The same movement can be seen in FIG. 25(a and b), where the face of the wheels 150 has been made transparent so that the wheel sprockets 986 can be seen engaging with the belt or chain 982, and the position of the mounting plate 992 can be seen.

In some examples, a single motor could be used to drive the wheel positioning mechanism on opposite sides of the load handling device. This is particularly convenient for a wheel positioning mechanism comprising a belt or chain, as described above. A shaft can be used to connect two wheel positioning mechanisms on opposing sides of the load handling device, and a single motor can be used to turn the shaft and drive the two belts or chains of the two wheel positioning mechanisms on opposite sides of the load handling device.

In some examples, one or more tensioners can be used to adjust the tension in the belt of chain 982. The one or more tensioners can be a separate component, or the sprocket 984 can act as a tensioner, for example by being adjustable in a vertical direction.

In a tenth embodiment of the present invention shown in FIGS. 26(a and b) and 27(a and b), the wheel positioning mechanism 1080 comprises a linear actuator 1082. The linear actuator comprises an outer part 1084 which is configured to move along the longitudinal axis of the linear actuator relative to an inner part 1086 of the linear actuator 1082. The linear actuator 1082 is connected to a pair of wheels 150 by a pair of linkages 1088. The linkages 1088 are pivotal linkages, pivotally connected to the linear actuator and rigidly connected to the motor casing/stator. Each wheel 150 is attached to the side of the load handling device 30 by means of a mounting plate 1092. The mounting plate 1092 is mounted to the side of the load handling device 30, and the wheel 150 is pivotably connected to the mounting plate so that the wheel can rotate about the eccentric axis 1090.

When the linear actuator 1082 is actuated, the outer part 1084 and the inner part 1086 of the linear actuator move apart along the longitudinal axis. The linkages 1088 pivot to accommodate the movement of the linear actuator 1082, and the wheels 150 rotate about their eccentric axes.

In FIG. 26(a) the wheel positioning mechanism 1080 is shown in the lowered state, with the wheels 150 engaged with the track 22 below. In FIG. 26(b) the wheel positioning mechanism 1080 is shown in the raised state, with the wheels 150 disengaged from the track 22 below. In the particular embodiment illustrated in FIG. 26(a and b), the wheels 150 have been rotated by about 60° about the eccentric axis 1090 between the lowered state in FIG. 26(a) and the raised state in FIG. 26(b). The wheel 150 on the left of the figure has been rotated anticlockwise and the wheel 150 on the right has been rotated clockwise, both about their respective eccentric axes 1090.

Figure 27:
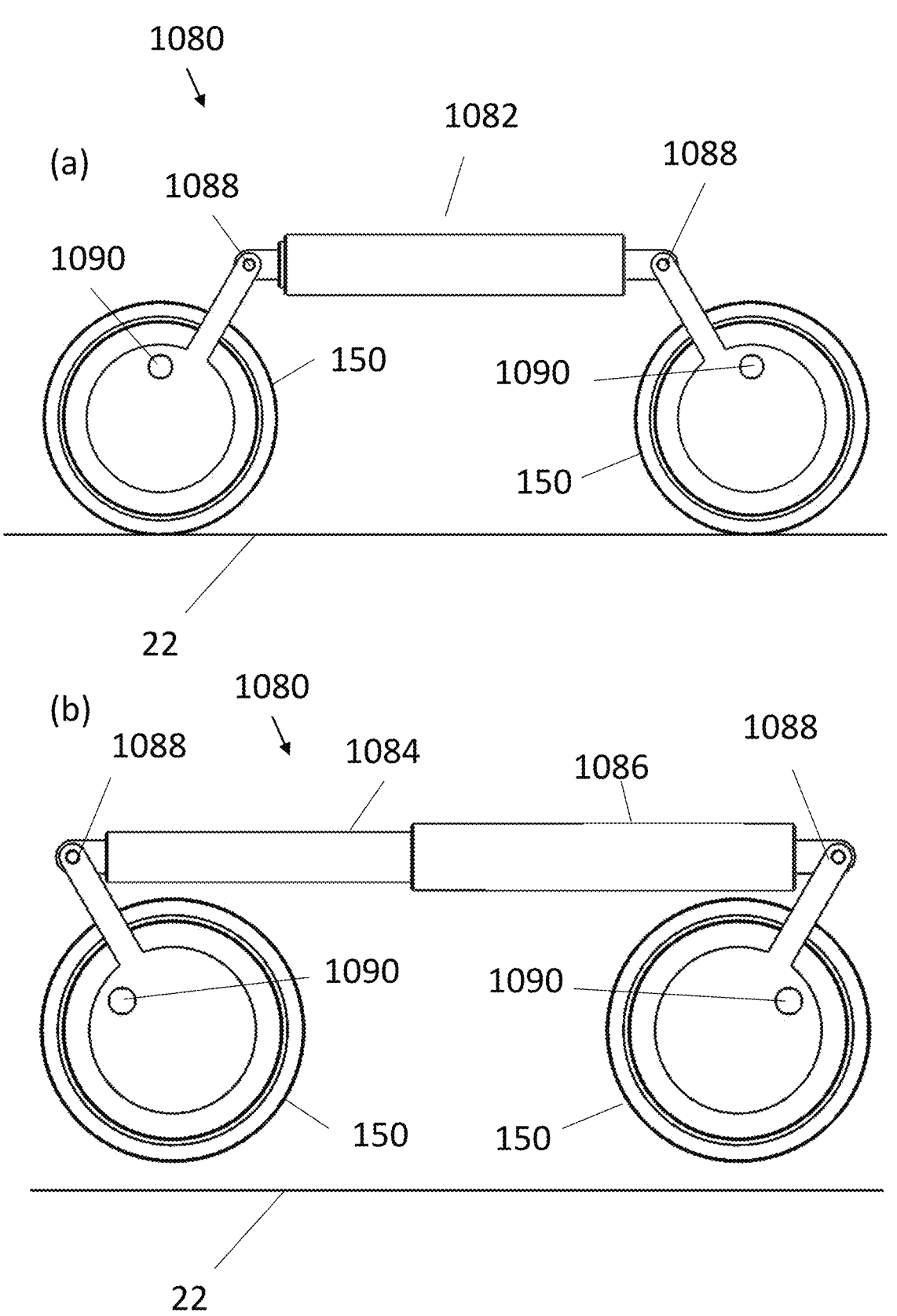
FIG. 27 is a schematic front view of the drive mechanism and wheel positioning mechanism according to a tenth embodiment of the present invention in (a) lowered and (b) raised positions.

The same movement can be seen in FIG. 27(a and b), where the linear actuator 1082 has been made transparent so that the relative positions of the outer part 1084 and the inner part 1086, and also the connection of the second part of the pivotal linkages 1088 to the wheel 150, can be seen. Although the ninth and tenth embodiments of the wheel positioning mechanism as illustrated in FIGS. 24 to 27 illustrate the wheel positioning mechanism applied to a pair of wheels, the wheel positioning mechanism is not limited to a pair of wheels. For example, the sets of wheels could comprise more than two wheels on each side of the load handling device with a wheel positioning mechanism operating on all of the wheels on one side of the load handling device, or a separate wheel positioning mechanism could be provided for each individual wheel, or a single wheel positioning mechanism could be used to raise or lower wheels on more than one side of the load handling device.

Figure 29:
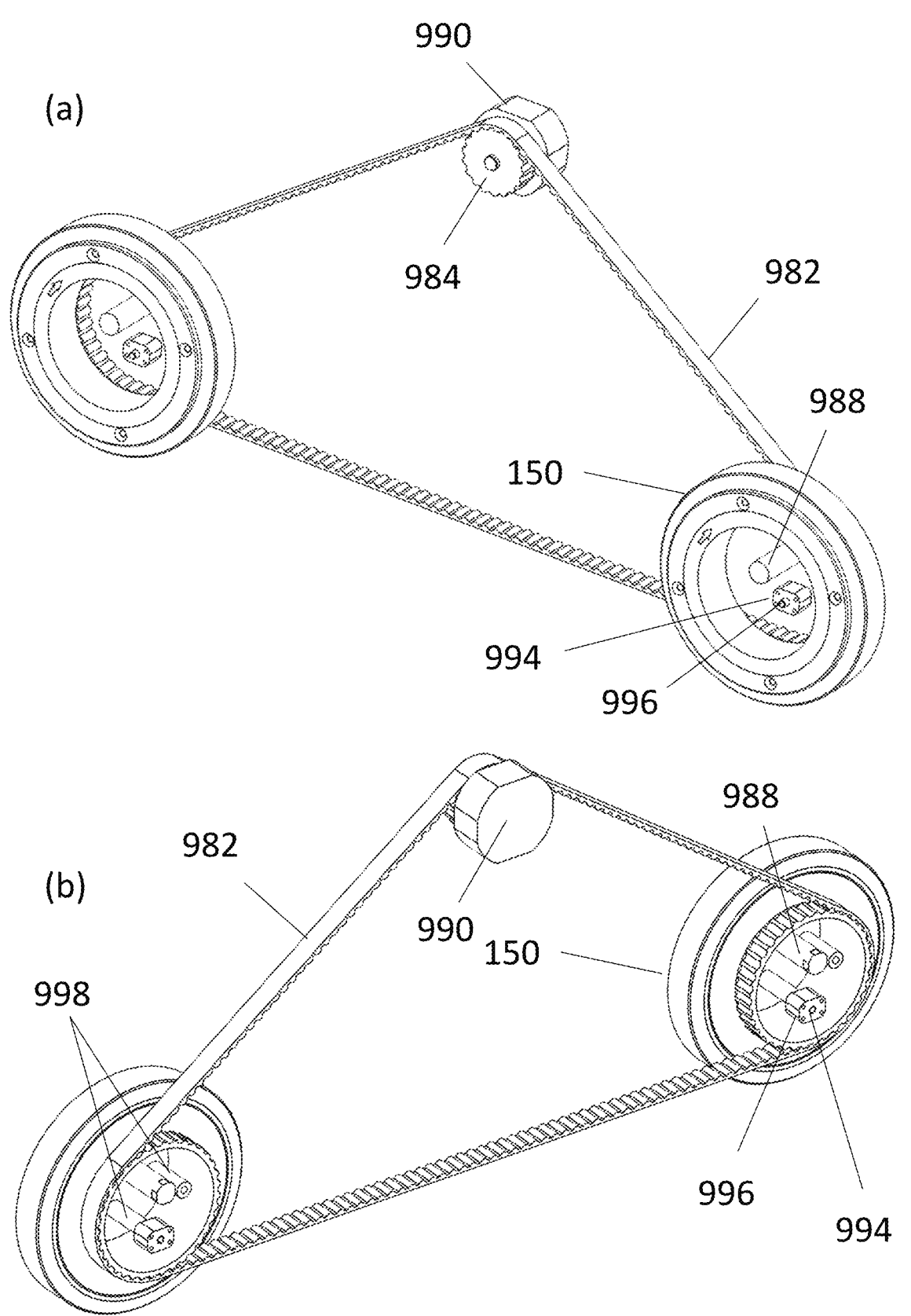
FIG. 29 is a schematic front view and rear view respectively of the locking mechanism of FIG. 28.
Figure 30:
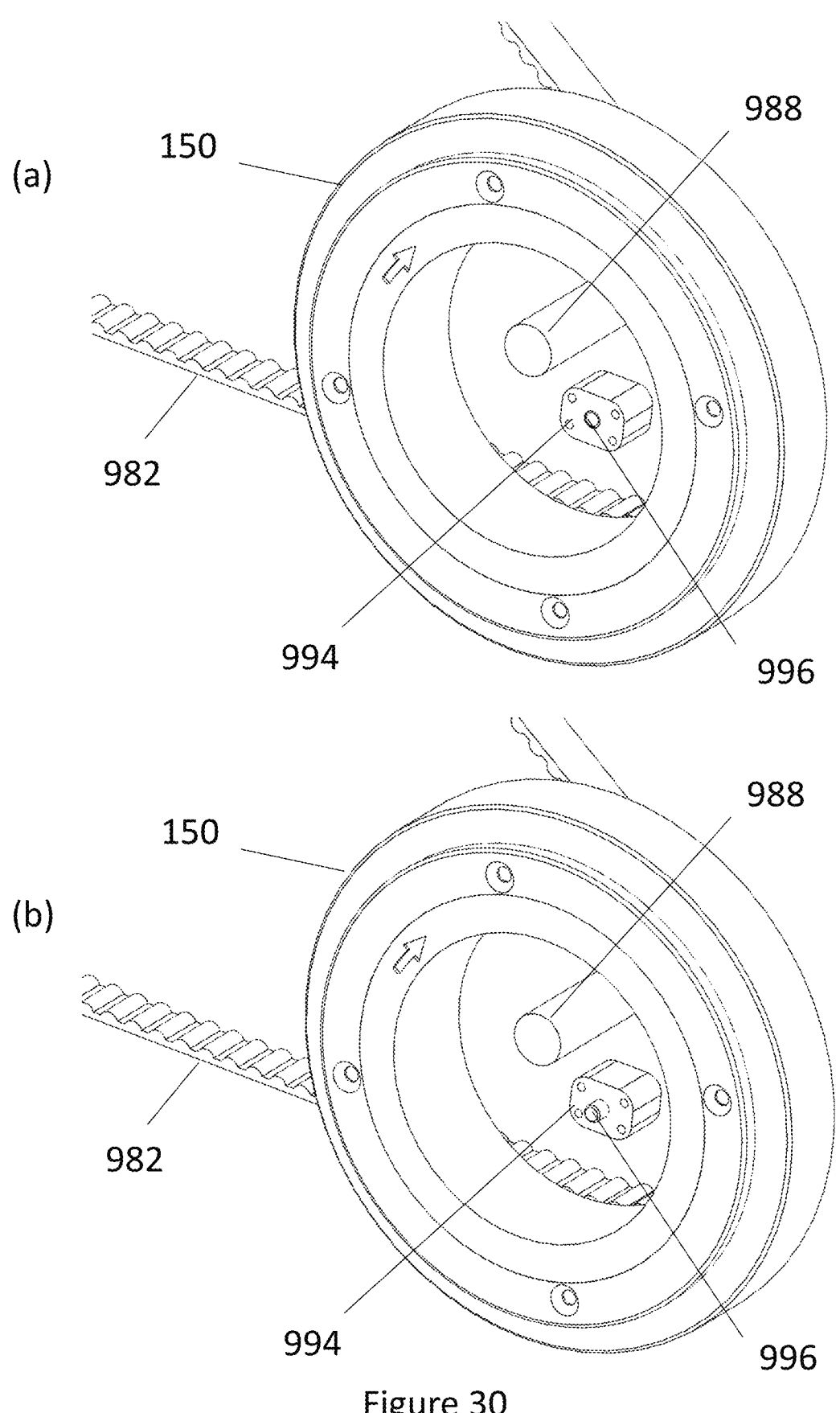
FIG. 30 is a schematic close-up view of a wheel with the locking mechanism of FIG. 28.

Another example of a locking mechanism is illustrated in FIG. 28(a and b), FIG. 29(a and b), and FIG. 30(a and b). This locking mechanism is illustrated applied to the ninth embodiment with a belt or chain 982, although this example of a locking mechanism could also be applied to a different wheel positioning mechanism, and equally a different locking mechanism could be used in conjunction with the belt or chain mechanism.

The locking mechanism illustrated in the figures comprises a linear solenoid 994 mounted to the side of the load handling device 30. Four mounting holes are visible on the linear solenoid 994. As shown in FIG. 28(a), the linear solenoid 994 comprises a pin 996, which is extended or retracted when the linear solenoid 994 is actuated. The pin 996 is configured to move parallel to the axis of the wheel 150, in a direction perpendicular to the plane of the wheel 150. The pin 994 is receivable in one or more latching holes 998. To actuate the locking mechanism to lock the wheel 150, the pin 996 is extended from the linear solenoid 994 into a latching hole 998, and thus prevents rotation of the wheel 150 about its eccentric axis 988. To unlock the wheel, the pin 996 is retracted back into the linear solenoid 994, so the wheel 150 is once again free to rotate about its eccentric axis 988, when the wheel sprocket 986 is driven by the belt or chain 982.

In the example illustrated in FIG. 28(*b*), two latching holes 998 are provided. A first latching hole 998*a* is used to lock the wheel 150 in the raised or stowed position, and a second latching hole 998*b* is used to lock the wheel 150 in the lowered or deployed position. On the left of FIG. 28(*b*), the wheel 150 is in the stowed position, raised above the rail 22, and the pin 996 is engaged with the first latching hole 998*a*. On the right of FIG. 28(*b*), the wheel 150 is in the deployed position, engaged with the rail 22, and the pin 996 is engaged with the second latching hole 998*b*.

FIG. 29(*a*) is a front view of the wheel positioning mechanism 980 with the centres of the wheels 150 removed so that the linear solenoid 994 and pin 996 can be seen. FIG. 29(*b*) illustrates the same mechanism from the rear, again with the centres of the wheels 150 removed so that the locking mechanism can be seen. The linear solenoid 996 can be seen engaging with the latching hole 998.

FIG. 30(*a* and *b*) is a close-up view of a wheel 150 with locking mechanism. In FIG. 30(*a*) the pin 996 is retracted into the linear solenoid 994, and the locking mechanism is not actuated. In FIG. 30(*b*), the pin 996 is extended from the linear solenoid 994, and the locking mechanism is actuated.

Each wheel of the first and second set of wheels has its own driving mechanism to rotate each wheel about its respective first and second axis of rotation. To move the load handling device in the first or second direction on the grid structure, the wheels in the first or the second set are configured to be actuated to rotate about their respective first axes of rotation in synchronization or substantially at the same time, and to change direction, the wheels in the first and/or the second set are configured to be actuated to rotate about their respective second axes of rotation. For example, to move the load handling device in the first direction, the drive mechanism of the first set of wheels can be instructed to rotate each of the first set of wheels about their respective first axes in synchronization. Similarly, to the move the load handling device in the second direction, the drive mechanism of the second set of wheels can be instructed to rotate each of the second set of wheels about their respective first axes in synchronization. To change direction on the grid structure, i.e. move in the first direction or in the second direction, the wheel positioning mechanism of each of the first and/or the second set of wheels can be instructed to rotate the relevant wheels (first or second set of wheels) about their respective second axes of rotation in synchronization to either engage or disengage with the first or second set of grid members.

Figure 23:
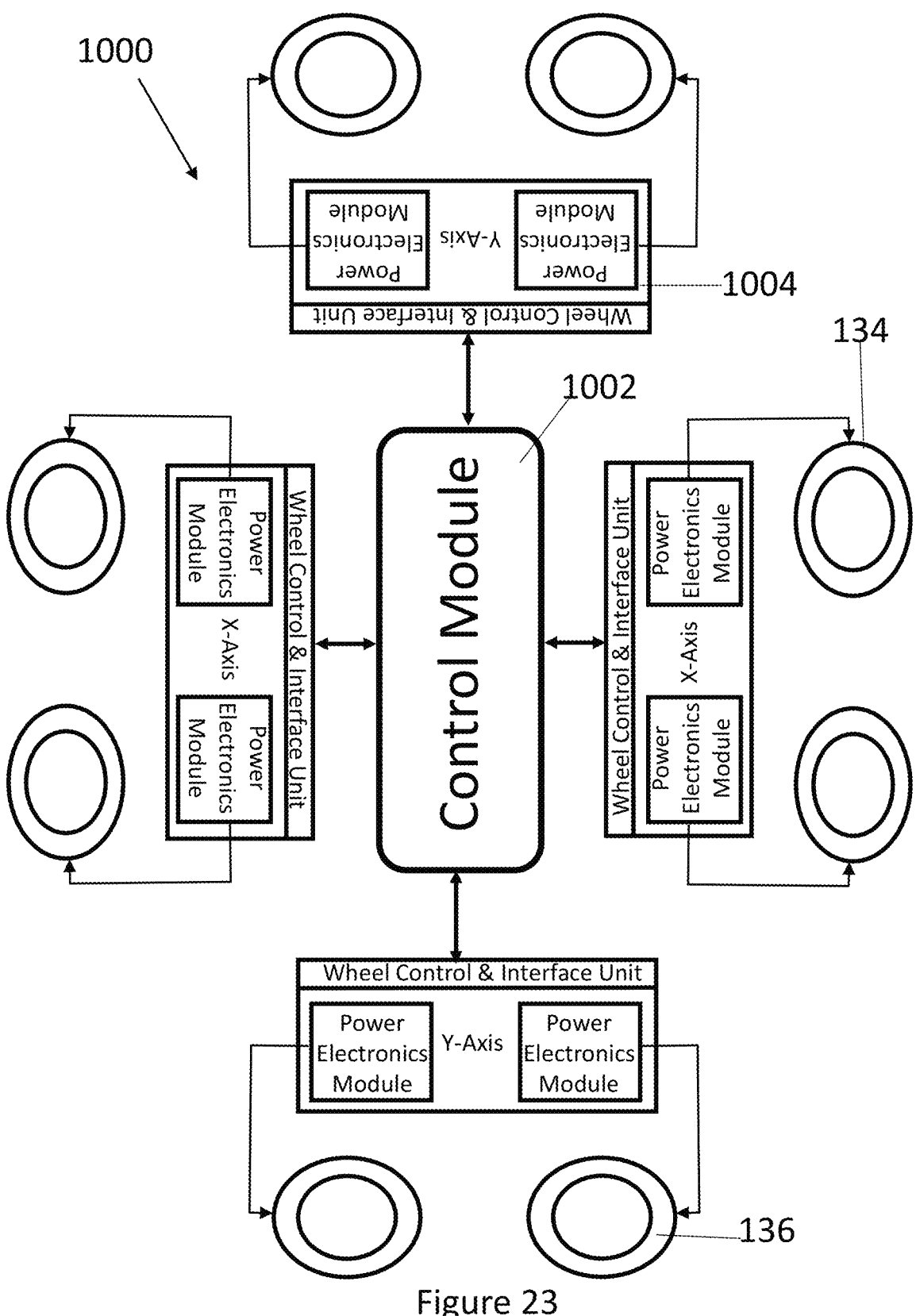
FIG. 23 is a wheel assembly control and interface architecture according to an embodiment of the present invention.

The conceptual system architecture for switching the load handling device's active running axis from the X to the Y direction on the grid structure via the lowering (deployment) and raising (stowage) of the first and second set of wheels can be captured in the wheel assembly control and interface architecture 1000 shown in FIG. 23. In FIG. 23, a pair of wheels 134 either side of the load handling device drive the load handling device in the X direction and a pair of wheels

136 either side of the load handling device drive the load handling device in the Y direction. Each of the pair of wheels of the first 134 and second 136 set of wheels are instructed to rotate about their respective first and second axes of rotation by a control module 1002. The control module 1002 can comprise one or more processors and memory storing instructions that when executed by the one or more processors cause the one or more processors to instruct the first or second set of wheels to rotate about their respective first or second axes of rotation in synchronization. The memory can be any storage device commonly known in the art and include but are not limited to a RAM, computer readable medium, magnetic storage medium, optical storage medium or other electronic storage medium which can be used to store data and accessed by the processor. The one or more processing devices can be any processing device known in the art. Typical examples include but are not limited to microprocessor. The driving mechanism and the wheel positioning mechanism of each of the wheels of the first 134 and second 136 set of wheels are communicatively coupled to the control module via any suitable communication interface unit 1004. These include but are not limited to any wired or wireless communication known in the art.

In operation, when changing direction of the load handling device's active running axis from the X to the Y direction or vice versa the controller or control module 1002 instructs the first 134 or second 136 set of wheels to be lowered so as to engage with the grid member or track. The instruction involves rotating the first 134 or second 136 set of wheels about their respective second axes of rotation using any of the different embodiments of the wheel positioning mechanisms discussed above. One or more sensors or positioning sensors can be used to detect the position of the first or second set of wheels in the raised or lowered state. The position sensors can be incorporated into each of the wheel positioning mechanisms of the first and second set of wheels.

In accordance with an embodiment of the present invention, it is preferable that all of the first 134 and second 136 set of wheels are engaged with their respective grid members or tracks prior to the first or second set of wheels being raised, i.e. stowed. To do this, the raised wheels that are in a stowed position are lowered first to engage with the grid members or tracks before the other set of wheels is raised or stowed.

Completing the operation of changing direction the other way around (raising the engaged wheels prior to lowering the other set of wheels) would be problematic. Raising the wheels that are currently engaged with the grid members or tracks so that all of the first and second sets of wheels are engaged with the grid members or tracks would put a huge burden on the lifting or second motors of the wheels to bear the full weight of the load handling device, which can reach weights of about 210 kg, when lifting the load handling device to disengage a set of wheels. This is because the weight of the load handling device would be supported by either the first or second sets of wheels without the locking mechanism engaged. First the load handling device would be lowered relative to the tracks as one set of wheels is raised, and then the other set of wheels would need to bear the weight of the load handling device while the other set of wheels is lowered and the whole weight of the load handling device is raised again. As well as putting excessive load on the wheel positioning mechanism while lowering the wheels, the raising and lowering of the whole weight of the load handling device is unnecessary and wastes energy. In the particular embodiment shown in FIG. 6, the weight of the load handling device is supported by four wheels actively engaging with the grid structure. The first or second sets of wheels are held in the deployed position by the individual locking mechanisms in each of the wheels. Once all of the first and second set of wheels are engaged with the grid members or tracks (i.e. in the deployed position) so that the load handling device is supported by all eight wheels, the relevant sets of wheels (first or second sets of wheels) are raised or stowed depending on whether the load handling device is moving in the X direction or the Y direction. Release of the locking mechanism will disengage the first or second sets of wheels to be raised or stowed by rotation about their respective second axes of rotation. The first or second set of wheels are raised in the stowed position in synchronization so that all of the first or second sets of wheels are raised at substantially the same time.

It will be appreciated that many different variations and modifications are possible in all of the different embodiments described above. For example, one or more wheels in a set can be powered by a single motor using a suitable transfer mechanism to transfer the power from the single motor to the appropriate sets of wheels.

The load handling device of the present invention is operable on a storage system comprising a grid framework structure, said grid framework structure comprising a plurality of upright members that support horizontal grid members arranged in a grid pattern. The grid framework structure is described with reference to FIGS. 1 and 2 and in PCT Publication No. WO2015/185628A (Ocado), the details of which are hereby incorporated by reference.

The load handling device can move one or more containers storing items such as grocery items or clothing. Alternatively, the containers can be shipping containers and the load handling device of the present invention arranged to move one or more shipping containers stacked in the grid framework structure.

The invention claimed is:

1. A load handling device for lifting and moving one or more containers stackable in a storage system, the storage system including a grid structure with a plurality of grid members arranged in a grid pattern for guiding movement of the load handling device on the grid structure, the load handling device comprising:

a) a container receiving space arranged to be located above a grid structure when in operation;

b) a lifting mechanism configured and arranged to lift a container from a stack into the container receiving space, said lifting mechanism including a driving mechanism configured for driving the lifting mechanism;

c) a vehicle body including an upper part and a lower part, said upper part of the vehicle body housing the driving mechanism;

d) a wheel assembly configured and arranged to support the vehicle body, the wheel assembly including a first set of wheels configured for engaging with a first set of grid members to guide movement of the load handling device in a first direction, and a second set of wheels configured for engaging with a second set of grid members to guide the movement of the load handling device in a second direction, wherein the second direction is transverse to the first direction, the first and second sets of wheels being arranged around the container receiving space in the lower part of the vehicle body, wherein each wheel of the first set of wheels and the second set of wheels is rotatable about a respective first axis of rotation and a respective second axis of rotation, the respective second axis of rotation is radially offset from the respective first axis of rotation; and wherein said radial offset is less than or equal to a radius of each wheel of the first set of wheels and the second set of wheels, and e) a drive mechanism for selectively driving rotation of the first set of wheels and the second set of wheels about their respective first axes of rotation;

wherein each wheel of the first and second set of wheels includes a wheel positioning mechanism configured to rotate the wheel about its respective second axis of rotation to selectively lower or raise the first set of wheels or the second set of wheels relative to the vehicle body, and thereby to selectively engage or disengage the first set of wheels with a first set of grid members or the second set of wheels with a second set of grid members when in operation.

2. The load handling device of claim 1, wherein the drive mechanism is arranged so that each wheel of the first set of wheels and/or the second set of wheels comprises:

a) a first drive mechanism for driving rotation of each respective wheel of the first set of wheels and/or the second set of wheels about its respective first axis of rotation; and wherein the wheel positioning mechanism comprises b) a second drive mechanism for driving rotation of each respective wheel about its second axis of rotation.

3. The load handling device of claim 2, comprising:

a controller including one or more processors and memory storing instructions that, when executed by the one or more processors, will cause the one or more processors to actuate the first drive mechanism to rotate each wheel of the first or second set of wheels about its respective first axis of rotation in synchronization.

4. The load handling device of claim 3, wherein the one or more processors is configured to execute the memory storing instructions to actuate the second drive mechanism to rotate each respective wheel of either the first or second set of wheels about its respective second axis of rotation in synchronization.

5. The load handling device of claim 2, wherein the first drive mechanism comprises:

an outer rotor that is annular around the respective first axis of rotation; and an inner hub, the outer rotor being rotatably mounted to an outer circumference of the inner hub such that the outer rotor is rotatable around the inner hub about the respective first axis of rotation.

6. The load handling device of claim 5, wherein the first drive mechanism comprises:

a hub motor.

7. The load handling device of claim 6, wherein the first drive mechanism comprises:

a motor or an electric motor.

8. The load handling device of claim 2, wherein the first drive mechanism comprises:

an outer rotor having an outer surface configured for engagement with a grid member/track; and an inner surface having a plurality of radial teeth to form an annular gear, and a driveshaft with a pinion gear mounted thereon, the pinion gear including a plurality of teeth arranged to mesh with the annular gear to transmit torque to rotate the outer rotor about its respective first axis of rotation.

9. The load handling device of claim 2, wherein the first drive mechanism comprises:

an outer rotor including a driveshaft having a sprocket mounted thereon; and a toothed belt coupled to the sprocket for transmitting torque to rotate the outer rotor about its respective first axis of rotation.

10. The load handling device of claim 2, wherein the wheel positioning mechanism comprises:

a rack and pinion gear mechanism, the rack and pinion gear mechanism including:

i) a curved rack having a plurality of teeth; and ii) a pinion gear engageable with the plurality of teeth of the curved rack and rotatable around the curved rack about the second axis of rotation, wherein the pinion gear is mounted to a portion of the wheel such that rotation of the pinion gear around the curved rack will selectively raise or lower the wheel of the first or second set of wheels relative to the vehicle body.

11. The load handling device of claim 10, wherein the second drive mechanism is configured for driving rotation of the pinion gear around the curved rack about the second axis of rotation.

12. The load handling device of claim 10, wherein the second drive mechanism is configured for driving rotation of the pinion gear relative to the curved rack or driving rotation of the curved rack relative to the pinion gear.

13. The load handling device of claim 2, wherein the second drive mechanism comprises:

a drive shaft configured to rotate the wheel about its respective second axis of rotation.

14. The load handling device of claim 2, wherein the wheel positioning mechanism comprises:

a planetary gear mechanism including a planetary gear and a sun gear, and wherein the planetary gear is mounted to a portion of the wheel and is engaged with the sun gear so as to rotate around the sun gear about the second axis of rotation by the second drive mechanism.

15. The load handling device of claim 14, wherein the sun gear has a rotational axis about the second axis of rotation.

16. The load handling device of claim 14, wherein the second drive mechanism is configured for driving rotation of the sun gear about the second axis of rotation.

17. The load handling device of claim 16, wherein the second drive mechanism is configured for driving rotation of the planetary gear around the sun gear.

18. The load handling device of claim 14, wherein the wheel positioning mechanism comprises:

an annular gear having an inner surface including a plurality of radial teeth, wherein the sun gear is coaxial with the annular gear and the planetary gear is engaged with the plurality of radial teeth of the annular gear so as to be driven around the inner surface of the annular gear by the sun gear about the second axis of rotation.

19. The load handling device of claim 2, wherein the wheel positioning mechanism comprises:

a belt or chain configured to drive rotation of one or more wheels of the first or second set of wheels, about their respective second axes such that movement of the belt or chain will selectively raise or lower the one or more wheels relative to the vehicle body.

20. The load handling device of claim 19, wherein the second drive mechanism is configured to drive the belt or chain.

21. The load handling device of claim 2, wherein the second driving mechanism comprises:

a linear actuator configured to drive rotation of one or more wheels of the first or second set of wheels, about their respective second axes such that movement of the linear actuator will selectively raise or lower the one or more wheels relative to the vehicle body.

22. The load handling device of claim 21, wherein the linear actuator is connected to the one or more wheels by one or more pivotal linkages such that the one or more pivotal linkages will convert linear motion of the linear actuator to rotational motion of the one or more wheels about their respective second axes.

23. The load handling device of claim 1, wherein the wheel positioning mechanism comprises:

a planetary gear mechanism including a planetary gear rotatable about the first axis of rotation and a sun gear, the planetary gear being mounted to a portion of the wheel and engaged with the sun gear such that rotation of the sun gear by the drive mechanism will cause the planetary gear to rotate about the first axis of rotation so as to move the load handling device in either of a first direction or a second direction on a grid structure, and wherein the sun gear has a rotational axis about the second axis of rotation.

24. The load handling device of claim 23, wherein the wheel positioning mechanism comprises:

a locking mechanism configured to lock rotation of the planetary gear about the first axis of rotation so as to allow the planetary gear to be driven by the sun gear about the second axis of rotation.

25. The load handling device of claim 1, comprising:

a locking mechanism configured to lock the first set of wheels or the second set of wheels in the raised position or the lowered position.

26. The load handling device of claim 1, wherein the second axis of rotation is radially offset from the first axis of rotation in a range of 10 mm to 30 mm.

27. The load handling device of claim 1, wherein the vehicle body houses one or more operational components, wherein the first set of wheels are mounted to a first pair of opposing sides of the vehicle body and the second set of wheels are mounted to a second pair of opposing sides of the vehicle body.

28. The load handling device of claim 1, wherein the wheel positioning mechanism is integrated into the wheel.

29. A load handling device of claim 1 in combination with a storage system, the combination comprising:

i) a grid structure including a plurality of grid members arranged in a grid pattern for guiding the movement of a load handling device on the grid structure;

ii) a plurality of stackable containers located below the grid structure, wherein each of the plurality of stackable containers occupies a single grid space or grid cell; and iii) the load handling device, the load handling device being remotely operated on the grid structure to move one or more containers and including:

i) a container-receiving space located above the grid structure; and ii) a lifting device arranged to lift a single container from a stack into the container-receiving space.

30. The load handing device and storage system of claim 29, wherein the lifting device comprises:

a lifting drive assembly and a grabber device configured, in use, to releasably grip a container and lift the container from the stack into the container-receiving space; and a driving mechanism configured and operatively arranged for moving the load handling device on the grid structure.

31. A method of controlling movement of a load handling device on a grid structure, the grid structure including a plurality of grid members arranged in a grid pattern, and the load handling device including:

a) a container receiving space arranged to be located above a grid structure when in operation;

b) a lifting mechanism configured and arranged to lift a container from a stack into the container receiving space, said lifting mechanism including a driving mechanism configured for driving the lifting mechanism;

c) a vehicle body including an upper part and a lower part, said upper part of the vehicle body housing the driving mechanism;

d) a wheel assembly configured and arranged to support the vehicle body, the wheel assembly including a first set of wheels configured for engaging with a first set of grid members to guide movement of the load handling device in a first direction, and a second set of wheels configured for engaging with a second set of grid members to guide the movement of the load handling device in a second direction, wherein the second direction is transverse to the first direction, the first and second sets of wheels being arranged around the container receiving space in the lower part of the vehicle body, wherein each wheel of the first set of wheels and the second set of wheels is rotatable about a respective first axis of rotation and a respective second axis of rotation, wherein the respective second axis of rotation is radially offset from the respective first axis of rotation; and wherein said radial offset is less than or equal to a radius of each wheel of the first set of wheels and the second set of wheels, and e) a drive mechanism for selectively driving rotation of the first set of wheels and the second set of wheels about their respective first axes of rotation;

wherein each wheel of the first and second set of wheels includes a wheel positioning mechanism configured to rotate the wheel about its respective second axis of rotation to selectively lower or raise the first set of wheels or the second set of wheels relative to the vehicle body, and thereby to selectively engage or disengage the first set of wheels with a first set of grid members or the second set of wheels with a second set of grid members when in operation, the method comprising:

rotating each wheel of the first or second set of wheels about its respective second axis of rotation so as to raise or lower the respective wheels relative to the vehicle body and engage or disengage the first set of wheels with the first set of grid members or the second set of wheels with the second set of grid members.

32. The method of claim 31, comprising:

i) lowering the first set of wheels by rotating each wheel of the first set of wheels about its respective second axis of rotation so that each wheel of the first and second set of wheels is engaged with the first set of grid members and the second set of grid members respectively; and ii) raising the second set of wheels by rotating each wheel of the second set of wheels about its respective second axis of rotation to disengage each wheel from the second set of grid members.

33. The method of claim 31, comprising:

locking each wheel of the first set of wheels or the second set of wheels in the raised and/or lowered position.

\* \* \* \* \*